US006539351B1

(12) United States Patent
Chen et al.

(10) Patent No.: US 6,539,351 B1
(45) Date of Patent: Mar. 25, 2003

(54) HIGH DIMENSIONAL ACOUSTIC MODELING VIA MIXTURES OF COMPOUND GAUSSIANS WITH LINEAR TRANSFORMS

(75) Inventors: Scott Shaobing Chen, Bronx, NY (US); Ramesh Ambat Gopinath, Millwood, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/566,092

(22) Filed: May 5, 2000

Related U.S. Application Data
(60) Provisional application No. 60/180,306, filed on Feb. 4, 2000.

(51) Int. Cl.[7] .............................................. G10L 15/14
(52) U.S. Cl. ...................... 704/236; 704/239; 704/240; 704/255
(58) Field of Search ................................ 704/236, 239, 704/240, 250, 255

(56) References Cited

U.S. PATENT DOCUMENTS

| 5,727,124 A | * | 3/1998 | Lee et al. ................... 704/233 |
| 5,864,810 A | * | 1/1999 | Digalakis et al. ........... 704/255 |
| 6,151,574 A | * | 11/2000 | Lee et al. ................... 704/256 |
| 6,269,334 B1 | * | 7/2001 | Basu et al. .................. 704/256 |
| 6,336,108 B1 | * | 1/2002 | Thiesson et al. ............. 706/20 |

OTHER PUBLICATIONS

H. Attias, "Independent Factor Analysis", Neural Computation, vol. 11, No. 4, pp. 803–851, May 1999.
Bell et al., "An Information–Maximization Approach to Blind Separation and Blind Deconvolution", Neural Computation, vol. 7, No. 6, pp. 1004–1034, Nov. 1995.
J.F. Cardoso, "Multidimensional Independent Component Analysis", Proceedings of ICASSP 98, vol. 4, pp. 1941–1944, Seattle, May 1998.

I. Cziszar, "I–Divergence Geometry Of Probability Distributions and Minimization Problems", Annals of Probability, vol. 3, No. 1, pp. 146–158, Feb. 1975.
Friedman, et al., "Projection Pursuit Density Estimation", Journal of the American Statistical Association, vol. 79, No. 387, pp. 599–608, Sep. 1984.
J.H. Friedman, "Exploratory Projection Pursuit", Journal of the American Statistical Association, vol. 82, No. 397, pp. 249–266, Mar. 1987.
Mark J.F. Gales, "Semi–Tied Covariance Matrices for Hidden Markov Models", IEEE Transactions on Speech and Audio Processing, vol. 7, No. 3, pp. 272–281, May 1999.
R.A. Gopinath, "Constrained Maximum Likelihood Modeling With Gaussian Distributions", Proc. of DARPA Speech Recognition Workshop, Feb. 8–11, Lansdowne, VA, 1998.
P.J. Huber, "Projection Pursuit", Annals of Statistics, vol. 13, No. 2, pp. 435–525, Apr. 1985.
N. Kumar, "Investigation of Silicon Auditory Models and Generalization of Linear Discriminant Analysis for Improved Speech Recognition", Ph.D. dissertation, John Hopkins University, Baltimore, MD, Mar. 1997, pp. i–xiv and 1–134.
Lee et al., "A Unifying Information–theoretic Framwork for Independent Component Analysis", International Journal on Mathematics and Computer Modeling, 1999, pp. 1–23.

* cited by examiner

Primary Examiner—Susan McFadden
(74) Attorney, Agent, or Firm—F. Chau & Associates, LLP

(57) ABSTRACT

A method is provided for generating a high dimensional density model within an acoustic model for one of a speech and a speaker recognition system. Acoustic data obtained from at least one speaker is transformed into high dimensional feature vectors. The density model is formed to model the feature vectors by a mixture of compound Gaussians with a linear transform, wherein each compound Gaussian is associated with a compound Gaussian prior and models each coordinate of each component of the density model independently by a univariate Gaussian mixture comprising a univariate Gaussian prior, variance, and mean. An iterative expectation maximization (EM) method is applied to the feature vectors. The EM method includes the step of computing an auxiliary function Q of the EM method.

19 Claims, 6 Drawing Sheets

HIGH DIMENSIONAL ACOUSTIC MODELING VIA MIXTURES OF COMPOUND GAUSSIANS WITH LINEAR TRANSFORMS

CROSS-REFERENCE TO RELATED APPLICATIONS

This is a non-provisional application claiming the benefit of provisional application Ser. No. 60/180,306, filed on Feb. 4, 2000, the disclosure of which is incorporated by reference herein.

This application is related to the application entitled "High Dimensional Data Mining and Visualization via Gaussianization", which is commonly assigned and concurrently filed herewith, and the disclosure of which is incorporated herein by reference.

BACKGROUND

1. Technical Field

The present invention generally relates to high dimensional data and, in particular, to methods for mining and visualizing high dimensional data through Gaussianization.

2. Background Description

Density Estimation in high dimensions is very challenging due to the so-called "curse of dimensionality". That is, in high dimensions, data samples are often sparsely distributed. Thus, density estimation requires very large neighborhoods to achieve sufficient counts. However, such large neighborhoods could cause neighborhood-based techniques, such as kernel methods and nearest neighbor methods, to be highly biased.

The exploratory projection pursuit density estimation algorithm (hereinafter also referred to as the "exploratory projection pursuit") attempts to overcome the curse of dimensionality by constructing high dimensional densities via a sequence of univariate density estimates. At each iteration, one finds the most non-Gaussian projection of the current data, and transforms that direction to univariate Gaussian. The exploratory projection pursuit is described by J. H. Friedman, in "Exploratory Projection Pursuit", J. American Statistical Association, Vol. 82, No. 397, pp. 249–66, 1987.

Recently, independent component analysis has attracted a considerable amount of attention. Independent component analysis attempts to recover the unobserved independent sources from linearly mixed observations. This seemingly difficult problem can be solved by an information maximization approach that utilizes only the independence assumption on the sources. Independent component analysis can be applied for source recovery in digital communication and in the "cocktail party" problem. A review of the current status of independent component analysis is described by Bell et al., in "A Unifying Information-Theoretic Framework for Independent Component Analysis", International Journal on Mathematics and Computer Modeling, 1999. Independent component analysis has been posed as a parametric probabilistic model, and a maximum likelihood EM algorithm has been derived, by H. Attias, in "Independent Factor Analysis", Neural Computation, Vol. 11, pp. 803–51, May 1999.

Parametric density models, in particular Gaussian mixture density models, are the most widely applied models in large scale high dimensional density estimation because they offer decent performance with a relatively small number of parameters. In fact, to limit the number of parameters in large tasks such as automatic speech recognition, one assumes only mixtures of Gaussians with diagonal covariances. There are standard EM algorithms to estimate the mixture coefficients and the Gaussian means and covariance. However, in real applications, these parametric assumptions are often violated, and the resulting parametric density estimates can be highly biased. For example, mixtures of diagonal Gaussians $$p(\chi) = \sum_{i=1}^{I} \pi_i G(\chi, \mu_i, \Sigma_i)$$

roughly assume that the data is clustered, and within each cluster the dimensions are independent and Gaussian distributed. However, in practice, the dimensions are often correlated within each cluster. This leads to the need for modeling the covariance of each mixture component. The following "semi-tied" covariance has been proposed:

$$\Sigma_i = A \Lambda_i A^T$$

where A is shared and for each component, $\Lambda_i$ is diagonal. This semi-tied co-variance is described by: M. J. F. Gales, in "Semi-tied Covariance Matrices for Hidden Markov Models", IEEE Transactions Speech and Audio Processing, Vol. 7, pp. 272–81, May 1999; and R. A. Gopinath, in "Constrained Maximum Likelihood Modeling with Gaussian Distributions", Proc. of DARPA Speech Recognition Workshop, February 8–11, Lansdowne, Va., 1998. Semi-tied covariance has been reported in the immediately preceding two articles to significantly improve the performance of large vocabulary continuous speech recognition systems. It should be appreciated that a compound Gaussian is no longer a diagonal Gaussian.

Accordingly, there is a need for a method that transforms high dimensional data into a standard Gaussian distribution which is computationally efficient.

SUMMARY OF THE INVENTION

The present invention is directed to high dimensional acoustic modeling via mixtures of compound Gaussians with linear transforms. In addition to providing a novel density model within an acoustic model, the present invention also provides an iterative expectation maximization (EM) method which estimates the parameters of the mixtures of the density model as well as of the linear transform.

According to a first aspect of the invention, a method is provided for generating a high dimensional density model within an acoustic model for one of a speech and a speaker recognition system. The density model has a plurality of components, each component having a plurality of coordinates corresponding to a feature space. The method includes the step of transforming acoustic data obtained from at least one speaker into high dimensional feature vectors. The density model is formed to model the feature vectors by a mixture of compound Gaussians with a linear transform. Each compound Gaussian is associated with a compound Gaussian prior and models each of the coordinates of each of the components of the density model independently by a univariate Gaussian mixture including a univariate Gaussian prior, variance, and mean.

According to a second aspect of the invention, the method further includes the step of applying an iterative expectation maximization (EM) method to the feature vectors, to estimate the linear transform, the compound Gaussian priors, and the univariate Gaussian priors, variances, and means.

According to a third aspect of the invention, the EM method includes the step of computing an auxiliary function Q of the EM method. The compound Gaussian priors and the univariate Gaussian priors are respectively updated, to maximize the auxiliary function Q. The univariate Gaussian variances, the linear transform, and the univariate Gaussian means are respectively updated to maximize the auxiliary function Q, the linear transform being updated row by row. The second updating step is repeated, until the auxiliary function Q converges to a local maximum. The computing step and the second updating step are repeated, until a log likelihood of the feature vectors converges to a local maximum.

According to a fourth aspect of the invention, the method further includes the step of updating the density model to model the feature vectors by the mixture of compound Gaussians with the updated linear transform. Each of the compound Gaussians is associated with one of the updated compound Gaussian priors and models each of the coordinates of each of the components independently by the univariate Gaussian mixtures including the updated univariate Gaussian priors, variances, and means.

According to a fifth aspect of the invention, the linear transform is fixed, when the univariate Gaussian variances are updated.

According to a sixth aspect of the invention, the univariate Gaussian variances are fixed, when the linear transform is updated.

According to a seventh aspect of the invention, the linear transform is fixed, when the univariate Gaussian means are updated.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to high dimensional acoustic modeling via mixtures of compound Gaussians with linear transforms. In addition to providing a novel density model within an acoustic model for a speech and/or speaker recognition system, the present invention also provides an iterative expectation maximization (EM) method which estimates the parameters of the mixtures of the density model as well as of the linear transform.

A general description of the present invention will now be given with respect to FIGS. 1–5 to introduce the reader to the concepts of the invention. Subsequently, more detailed descriptions of various aspects of the invention will be provided.

Figure 1:
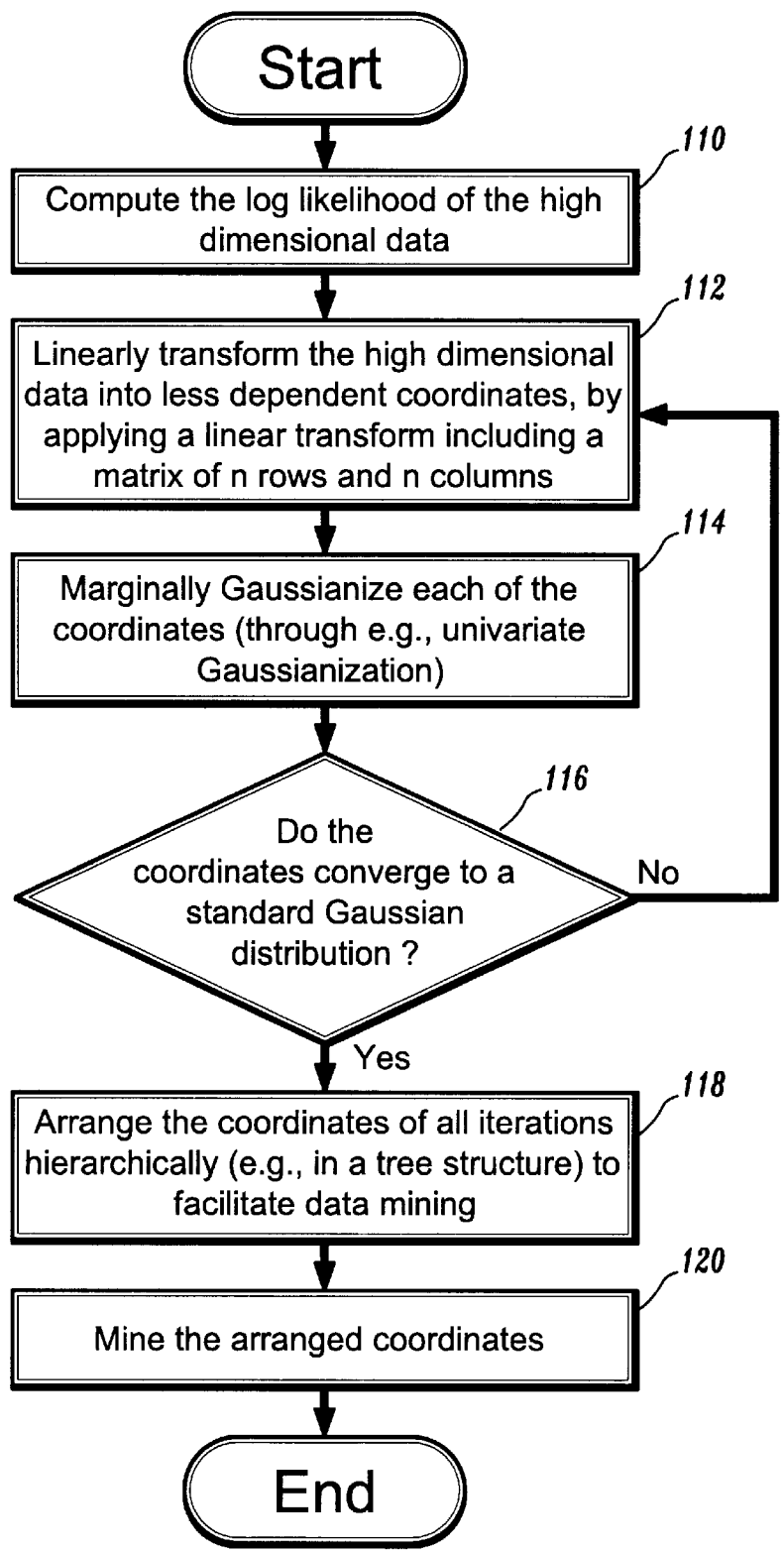
FIG. 1 is a flow diagram illustrating a method for mining high dimensional data according to an illustrative embodiment of the present invention.

FIG. 1 is a flow diagram illustrating a method for mining high dimensional data according to an illustrative embodiment of the present invention. The method of FIG. 1 is an implementation of the iterative Gaussianization method mentioned above and described in further detail below.

The log likelihood of the high dimensional data is computed (step 110). The high dimensional data is linearly transformed into less dependent coordinates, by applying a linear transform of n rows by n columns to the high dimensional data (step 112). Each of the coordinates are marginally Gaussianized, said Gaussianization being characterized by univariate Gaussian means, priors, and variances (step 114).

It is then determined whether the coordinates converge to a standard Gaussian distribution (step 116). If not, then the method returns to step 112. As is evident, the transforming and Gaussianizing steps (112 and 114, respectively) are iteratively repeated until the coordinates converge to a standard Gaussian distribution, as determined at step 116.

If the coordinates do converge to a standard Gaussian distribution, then the coordinates of all iterations are arranged hierarchically to facilitate data mining (step 118). The arranged coordinates are then mined (step 120).

Figure 2:
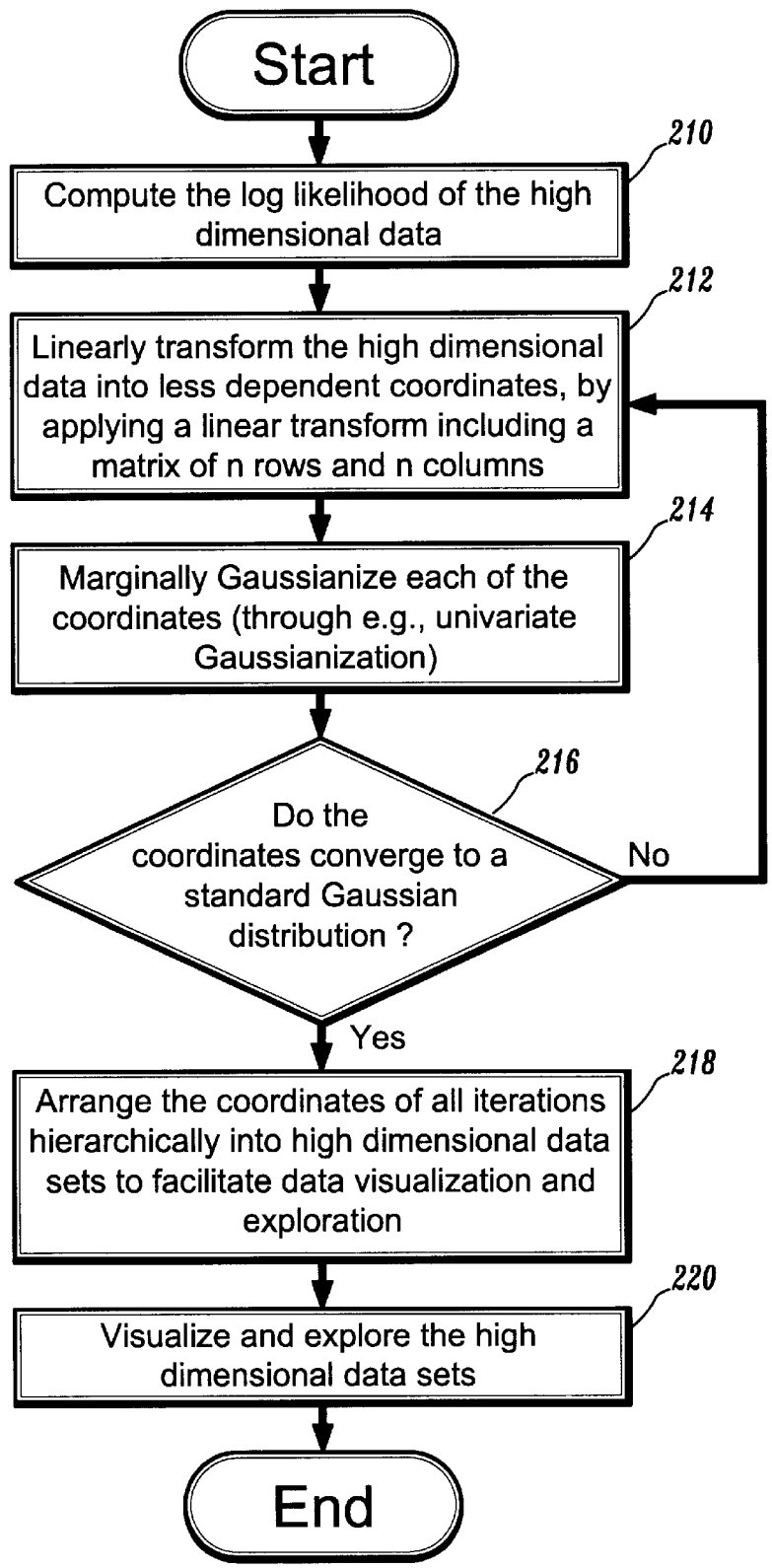
FIG. 2 is a flow diagram illustrating a method for visualizing high dimensional data according to an illustrative embodiment of the present invention.

FIG. 2 is a flow diagram illustrating a method for visualizing high dimensional data according to an illustrative embodiment of the present invention. The method of FIG. 2 is also an implementation of the iterative Gaussianization method mentioned above and described in further detail below.

The log likelihood of the high dimensional data is computed (step 210). The high dimensional data is linearly transformed into less dependent coordinates, by applying a linear transform of n rows by n columns to the high dimensional data (step 212). Each of the coordinates are marginally Gaussianized, said Gaussianization being characterized by univariate Gaussian means, priors, and variances (step 214).

It is then determined whether the coordinates converge to a standard Gaussian distribution (step 216). If not, then the method returns to step 212. As is evident, the transforming and Gaussianizing steps (212 and 214, respectively) are iteratively repeated until the coordinates converge to a standard Gaussian distribution, as determined at step 216.

If the coordinates do converge to a standard Gaussian distribution, then the coordinates of all iterations are arranged hierarchically into high dimensional data sets to facilitate data visualization (step 218). The high dimensional data sets are then visualized (step 220).

Figure 3:
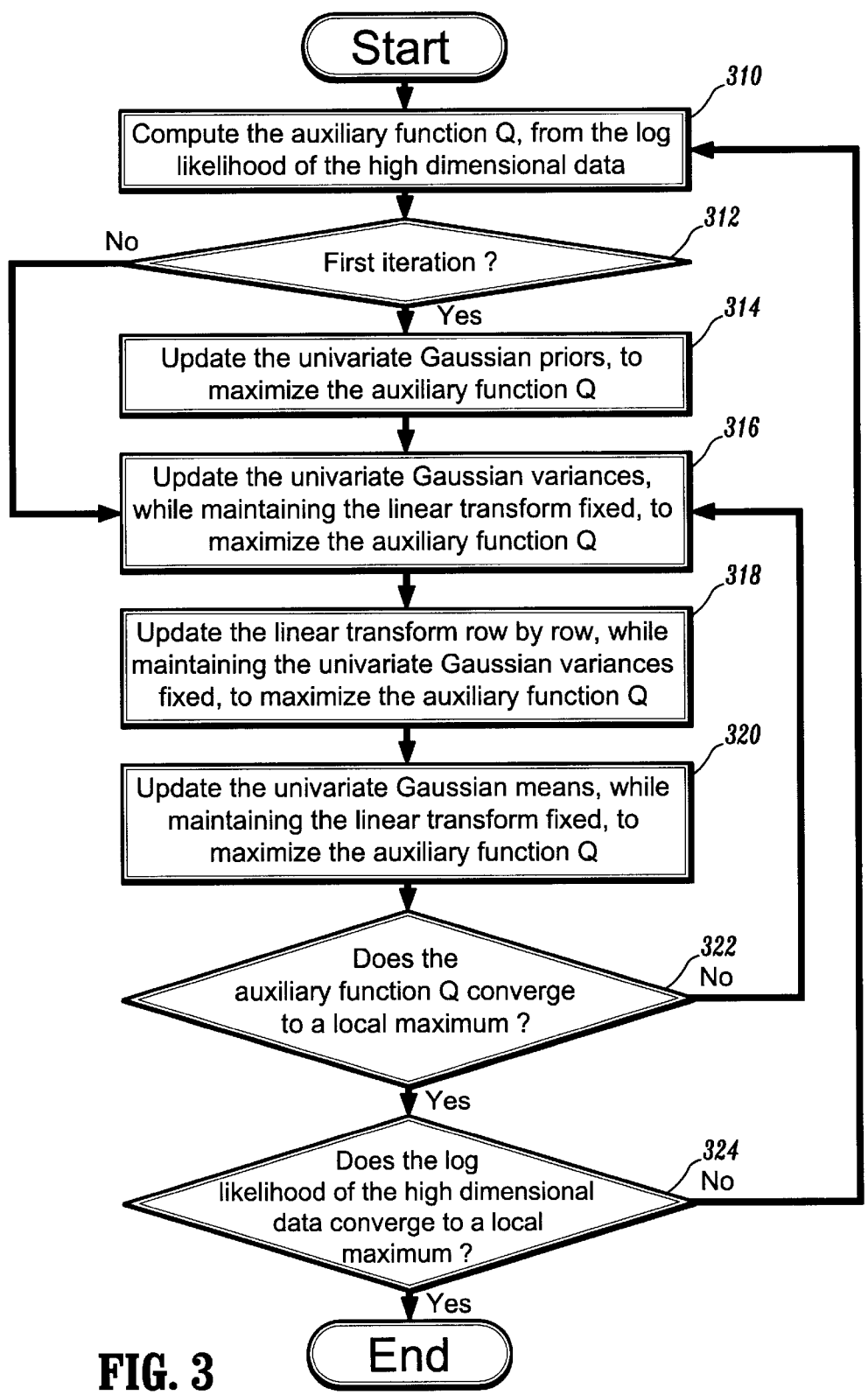
FIG. 3 is a flow diagram illustrating steps 112 and 212 of FIGS. 1 and 2, respectively, in further detail according to an illustrative embodiment of the present invention.

FIG. 3 is a flow diagram illustrating steps 112 and 212 of FIGS. 1 and 2, respectively, in further detail according to an illustrative embodiment of the present invention. It is to be appreciated that the method of FIG. 3 is an implementation of the iterative expectation maximization (EM) method of the invention mentioned above and described in further detail below.

The auxiliary function Q is computed from the log likelihood of the high dimensional data (step 310). It is then determined whether this is the first iteration of the EM method of FIG. 3 (step 312). If so, then the method proceeds to step 314. Otherwise, the method proceeds to step 316 (thereby skipping step 314).

At step 314, the univariate Gaussian priors are updated, to maximize the auxiliary function Q. At page 316, the univariate Gaussian variances are updated, while maintaining the linear transform fixed, to maximize the auxiliary function Q. The linear transform is updated row by row, while maintaining the univariate Gaussian variances fixed, to maximize the auxiliary function Q (step 318). The univariate Gaussian means are updated, while maintaining the linear transform fixed, to maximize the auxiliary function Q (step 320).

It is then determined whether the auxiliary function Q converges to a local maximum (step 322). If not, then the method returns to step 316. As is evident, the steps of updating the univariate Gaussian variances, the linear transform, and the univariate Gaussian means (316, 318, and 320, respectively) are iteratively repeated until the auxiliary function Q converges to a local maximum, as determined at step 322.

If the auxiliary function Q converges to a local maximum, then it is determined whether the log likelihood of the high dimensional data converges to a local maximum (step 324). If not, the method returns to step 310. As is evident, the computing step (310) and all of the updating steps other than the step of updating the univariate Gaussian priors (316–320) are iteratively repeated until the auxiliary function Q converges to a local maximum (as determined at step 322) and the log likelihood of the high dimensional data converges to a local maximum (as determined at step 324). If the log likelihood of the high dimensional data converges to a local maximum, then the EM method is terminated.

Figure 4:
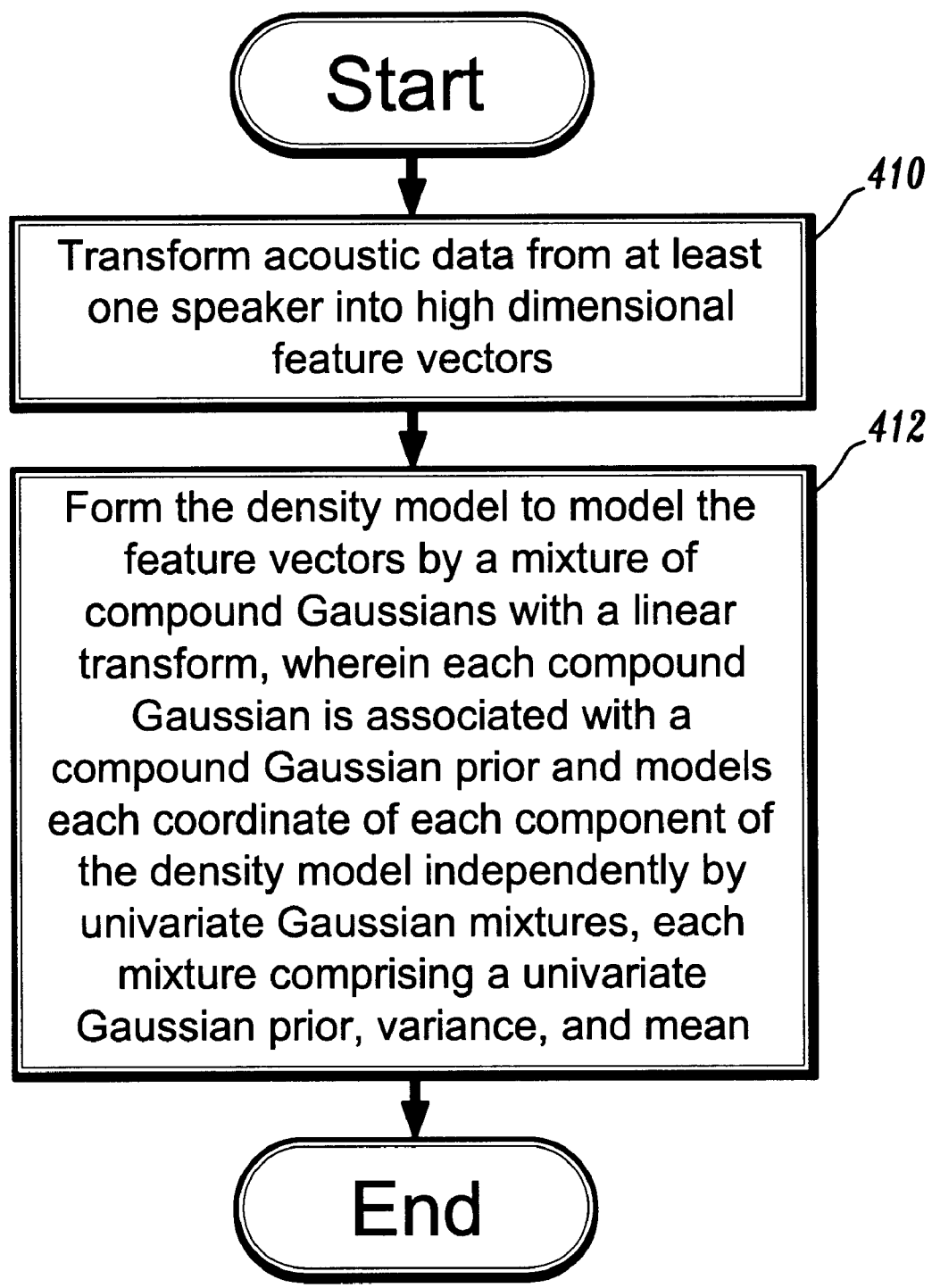
FIG. 4 is a flow diagram of a method for generating a high dimensional density model within an acoustic model for a speech and/or a speaker recognition system, according to an illustrative embodiment of the invention.

FIG. 4 is a flow diagram of a method for generating a high dimensional density model within an acoustic model for a speech and/or a speaker recognition system, according to an illustrative embodiment of the invention. The density model has a plurality of components, each component having a plurality of coordinates corresponding to a feature space. It is to be noted that the method of FIG. 4 is directed to forming a density model having a novel structure as further described below.

Acoustic data obtained from at least one speaker is transformed into high dimensional feature vectors (step 410). The density model is formed to model the high dimensional feature vectors by a mixture of compound Gaussians with a linear transform (step 412). Each of the compound Gaussians of the mixture is associated with a compound Gaussian prior and models each coordinate of each component of the density model independently by. univariate Gaussian mixtures. Each univariate Gaussian mixture comprises a univariate Gaussian prior, variance, and mean.

Figure 5:
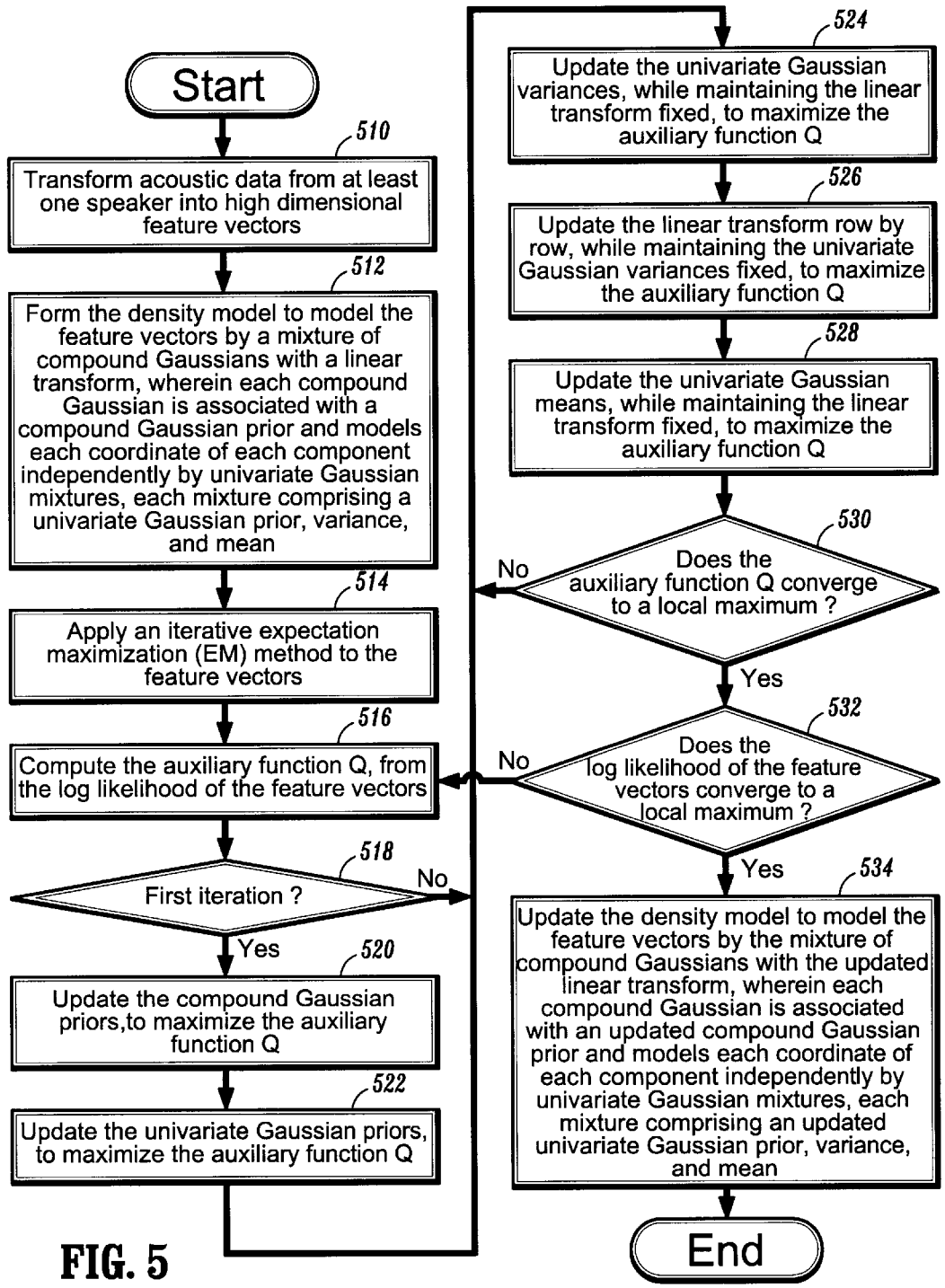
FIG. 5 is a flow diagram of a method for generating a high dimensional density model within an acoustic model for a speech and/or a speaker recognition system, according to an illustrative embodiment of the invention.

FIG. 5 is a flow diagram of a method for generating a high dimensional density model within an acoustic model for a speech and/or a speaker recognition system, according to another illustrative embodiment of the present invention. The density model has a plurality of components, each component having a plurality of coordinates corresponding to a feature space. It is to be noted that the method of FIG. 5 is directed to forming a density model having a novel structure as per FIG. 4 and, further to estimating the parameters of the density model. The method of FIG. 5 is an implementation of the iterative expectation maximization method of the invention mentioned above and described in further detail below.

Acoustic data obtained from at least one speaker is transformed into high dimensional feature vectors (step 510). The density model is formed to model the feature vectors by a mixture of compound Gaussians with a linear transform (step 512). Each compound Gaussian is associated with a compound Gaussian prior. Also, each compound Gaussian models each coordinate of each component of the density model independently by a univariate Gaussian mixture. Each univariate Gaussian mixture comprises a univariate Gaussian prior, variance, and mean.

An iterative expectation maximization (EM) method is applied to the feature vectors (step 514). The EM method includes steps 516–528. At step 516, an auxiliary function of the EM method is computed from the log likelihood of the high dimensional feature vectors. It is then determined whether this is the first iteration of the EM method of FIG. 5 (step 518). If so, then the method proceeds to step 520. Otherwise, the method proceeds to step 524 (thereby skipping steps 520 and 522).

At step 520, the compound Gaussian priors are updated, to maximize the auxiliary function Q. At step 522, the univariate Gaussian priors are updated, to maximize the auxiliary function Q.

At step 524, the univariate Gaussian variances are updated, while maintaining the linear transform fixed, to maximize the auxiliary function Q. The linear transform is updated row by row, while maintaining the univariate Gaussian variances fixed, to maximize the auxiliary function Q (step 526). The univariate Gaussian means are updated, while maintaining the linear transform fixed, to maximize the auxiliary function Q (step 528).

It is then determined whether the auxiliary function Q converges to a local maximum (step 530). If not, then the method returns to step 524. As is evident, the steps of updating the univariate Gaussian variances, the linear transform, and the univariate Gaussian means (524, 526, and 528, respectively) are iteratively repeated until the auxiliary function Q converges to a local maximum, as determined at step 530.

If the auxiliary function Q converges to a local maximum, then it is determined whether the log likelihood of the high dimensional feature vectors converges to a local maximum (step 532). If not, the method returns to step 516. As is evident, the computing step (516) and all of the updating steps other than the steps of updating the compound and univariate Gaussian priors (524–528) are iteratively repeated until the auxiliary function Q converges to a local maximum (as determined at step 532).

If the log likelihood of the high dimensional feature vectors converges to a local maximum, then the density model is updated to model the feature vectors by the mixture of compound Gaussians with the updated linear transform (step 534). Each compound Gaussian is associated with an updated compound Gaussian prior and models each coordinate of each component independently by the univariate Gaussian mixtures. Each univariate Gaussian mixture comprises an updated univariate Gaussian prior, variance, and mean.

More detailed descriptions of various aspects of the present invention will now be provided. The present invention provides a method that transforms multi-dimensional random variables into standard Gaussian random variables. For a random variable $X \in R^n$, the Gaussianization transform T is defined as an invertible transformation of X such that $$T(X) \sim N(0,I).$$

The Gaussianization transform corresponds to a density estimation $$p(x) = \left|\frac{\partial T}{\partial X}\right| \left(\frac{1}{\sqrt{2\pi}}\right)^n \exp\left(-\|\frac{1}{2}T(X)\|^2\right).$$ (5)

The Gaussianization method of the invention is iterative and converges. Each iteration is parameterized by univariate parametric density estimates and can be efficiently solved by an expectation maximization (EM) algorithm. Since the Gaussianization method of the invention involves univariate density estimates only, it has the potential to overcome the curse of dimensionality. Some of the features of the Gaussianization method of the invention include the following:

(1) The Gaussianization method of the invention can be viewed as a parametric generalization of Friedman's exploratory projection pursuit and can be easily accommodated to perform arbitrary d-dimensional projection pursuit.

(2) Each of the iterations of the Gaussianization method of the invention can be viewed as solving a problem of independent component analysis by maximum likelihood. Thus, according to an embodiment of the invention, an EM method is provided that is computationally more attractive than the noiseless independent factor analysis algorithm described by H. Attias, in "Independent Factor Analysis", Neural Computation, Vol. 11, pp. 803–51, May 1999.

(3) The probabilistic models of the invention can be viewed as a generalization of the mixtures of diagonal Gaussians with explicit description of the non-Gaussianity of each dimension and the dependency among the dimensions.

(4) The Gaussianization method of the present invention induces independent structures which can be arranged hierarchically as a tree.

In the problem of classification, we are often interested in transforming the original feature to obtain more discriminative features. To this end, most of the focus of the prior art has been on linear transforms such as: linear discriminant analysis (LDA); maximum likelihood linear transform (MLLT); and semi-tied covariances. In contrast, the present invention provides nonlinear feature extraction based on Gaussianization. Efficient EM type methods are provided herein to estimate such nonlinear transforms.

A description of Gaussianization will now be given. For a random variable $X \in R^n$, we define its Gaussinization transform to be invertible and its differential transform $T(X)$ such that the transformed variable $T(X)$ follows the standard Gaussian distribution:

$$T(X) \sim N(0,I).$$

Naturally, the following questions arise. Does a Gaussianization transform exist? If so, is it unique? Moreover, how can one construct a Gaussianization transformation from samples of the random variable X? As is shown below with minor regularity assumptions on the probability density of X, a Gaussianization transform exists and the transform is not unique. The constructive algorithm, however, is not amenable to being used in practice on samples of X. For estimation of the Gaussianization transform from sample data (i.e., given i.i.d. observations $\{X_i : 1 \le i \le L\}$ and regularity conditions on the probability density function of X viz., that it is strictly positive and continuously differentiable), an iterative Gaussianization method is provided wherein, at each iteration, a maximum-likelihood parameter estimation problem is solved. Let $\phi(x)$ be the probability density function of the standard normal $$\phi(x) = \frac{1}{\sqrt{2\pi}} \exp\left(-\frac{x^2}{2}\right)$$

and let $\Phi(x)$ be the cumulative distribution function (CDF) of the standard normal $$\Phi(x) = \int_{-\infty}^{x} \frac{1}{\sqrt{2\pi}} \exp\left(-\frac{y^2}{2}\right) dy.$$

A description of one dimensional Gaussianization will now be given. Let us first consider the univariate case: $X \in R^1$. Let $F(X)$ be the cumulative distribution function of X:

$$F(x) = P(X \le x).$$

It can be easily verified that $$\Phi^{-1}(F(X)) \sim N(0,1).$$ (1)

In practice, the CDF $F(X)$ is not available; it has to be estimated from the training data. According to an embodiment of the invention, it is approximated by Gaussian mixture models $$p(x) = \sum_{i=1}^{I} \pi_i G(x, \mu_i, \sigma_i^2)$$

i.e., we assume the CDF $$F(x) = \sum_{i=1}^{I} \pi_i \Phi\left(\frac{x - \mu_i}{\sigma_i}\right).$$

Therefore, we parameterize the Gaussianization transform as $$T(X) = \Phi\left(\sum_{i=1}^{I} \pi_i \Phi\left(\frac{x - \mu_i}{\sigma_i}\right)\right)$$ (2)

where the parameters $\{\pi_i, \mu_i, \sigma_i\}$ can be estimated via maximum likelihood using the standard EM algorithm.

A description of the existence of high dimensional Gaussianization will now be given. For any random variable $X \in R^n$, the Gaussianization transform can be constructed theoretically as a sequence of n one dimensional Gaussianization. Let $X^{(0)} = X$. Let $p^{(0)}(x_1^{(0)}, \ldots, x_n^{(0)})$ be the probability density function. First, we Gaussianize the first coordinate $X_1^{(0)}$ $$X_1^{(1)} = T^{(1)}(X_1^{(0)}) = \Phi(F_{x_1^{(0)}}^{-1}(X_1^{(0)}))$$

where $F_{x_1^{(0)}}^{-1}$ is the marginal CDF of $X_1^{(0)}$ $$F_{x_1^{(0)}}^{-1}(x_1^{(0)}) = P(X_1^{(0)} \le x_1^{(0)}).$$

The remaining coordinates are left unchanged $$X_d^{(1)} = X_d^{(0)} \quad d=2, \ldots n$$

Let $p^{(1)}(x_1^{(1)}, \ldots, x_n^{(1)})$ be the density of the transformed variable $X^{(1)}$. Clearly, $$p^{(1)}(x_1^{(1)}, \ldots, x_n^{(1)}) = \phi(x_1^{(1)})p^{(1)}(x_2^{(1)}, \ldots, x_n^{(1)} | x_1^{(1)})$$
$$= \phi(x_1^{(1)})p^{(1)}(x_2^{(1)}|x_1^{(1)})p^{(1)}(x_3^{(1)}, \ldots, x_n^{(1)}|x_1^{(1)}, x_2^{(1)}).$$

We can then Gaussianize the conditional distribution $p^{(1)}(x_2^{(1)}|x_1^{(1)})$:

$$X_2^{(2)} = T_{x_1^{(1)}}^{(2)}(X_2^{(1)}) = \Phi(F_{x_2^{(1)}|x_1^{(1)}}^{-1}(X_2^{(1)}))$$

where $\Phi(F_{x_2^{(1)}|x_1^{(1)}}^{-1})$ is the CDF of the conditional density $p^{(1)}(x_2^{(1)}|x_1^{(1)})$. The remaining coordinates are left unchanged:

$$X_d^{(2)} = X_d^{(1)} \quad d=1, 3, \ldots, n.$$

Let $p^{(2)}(x_1^{(2)}, \ldots, x_n^{(2)})$ be the density of the transformed variable $X^{(2)}$:

$$p^{(2)}(x_1^{(2)}, \ldots, x_n^{(2)}) = \phi(x_2^{(2)})p^{(2)}(x_3^{(2)}, \ldots, x_n^{(2)}|x_1^{(2)}, x_2^{(2)})$$

Then, we can Gaussianize the conditional density $p^{(2)}(x_3^{(2)}|x_1^{(2)}, x_2^{(2)})$ and so on. After n steps, we obtain the transformed variable $x^{(n)}$ which is standard Gaussian:

$$p^{(n)}(x_1^{(n)}, \ldots x_n^{(n)}) = \phi(x_n^{(n)})$$

The above construction is not practical (i.e., we cannot apply it easily when we have sample data from the original random variable X) since at the (k+1)-th step, it requires the conditional density $p^{(k)}(x_{k+1}^{(k)}|x_1^{(k)}, \ldots x_k^{(k)})$ for all possible $x_1^{(k)}, \ldots x_k^{(k)}$, which is extremely difficult given finite sample points. It is clear that the Gaussianization transform is not unique since the construction above could have used any other ordering of the coordinates. Advantageously, one embodiment of the invention provides a novel, iterative Gaussianization method that is practical and converges; proof of the former is provided below.

A description of Gaussianization with independent u: component analysis assumption will now be given. Let $X=(x_1, \ldots, x_n)^T$ be the high dimensional random variable to be Gaussianized. If we assume that the individual dimensions are independent, i.e., $$p(x_1, \ldots, x_n) = p(x_1) \ldots p(x_n),$$

we can then simply Gaussianize each dimension by the univariate Gaussianization and obtain the global Gaussianization.

However, the above independence assumption is rarely valid in practice. Thus, we can relax the assumption by using the following independent component analysis assumption: assume that there exists a linear transform $A_{n \times n}$ such that the transformed variable $$Y=(y_1, \ldots, y_n)^T = AX,$$

has independent components:

$$p(y_1, \ldots, y_n) = p(y_1) \ldots p(y_n)$$

Therefore, we can first find the linear transformation A, and then Gaussianize each individual dimension of Y via univariate Gaussianization. The linear transform A can be recovered by independent component analysis, as described by Bell et al., in "An Information-Maximization Approach to Blind Separation and Blind Deconvolution", Neural Computation, Vol. 7, pp. 1004–34, November 1999.

As in the univariate case, we model each dimension of Y by a mixture of univariate Gaussians $$p(y_d) = \sum_{i=1}^{I_d} \pi_{d,i} G(y_d, \mu_{d,i}, \sigma_{d,i}^2)$$

and parametrize the Gaussianization transform as $$t_d = \Phi^{-1}\left(\sum_{i=1}^{I_d} \pi_{d,i} \Phi\left(\frac{y_d - \mu_{d,i}}{\sigma_{d,i}}\right)\right)$$

and $$T=(t_1, \ldots, t_n)^T \sim N(0, I).$$

The parameters $\Theta=(A, \pi_{d,i}, \mu_{d,i}, \sigma_{d,i})$ can be efficiently estimated by maximum likelihood via EM. Let $\{x_n \in R^D : 1 \leq n \leq N\}$ be the training set. Let $\{y_n = Ax_n : 1 \leq n \leq N\}$ be the transformed data. Let $\{y_n \in R^D, x_n \in R^D, z_n \in N^D : 1 \leq n \leq N\}$ be the complete data, where $z_n = (z_{n,1} \ldots z_{n,D})$ indicates the index of the Gaussian component along each dimension. It is clear that $$z_{n,d} \sim \text{Multinomial}(1, (\pi_{d,1}, \ldots, \pi_{d,I_d}))$$

$$y_d | z_{n,d} = i \sim N(x_d, \mu_{d,i}, \sigma_{d,i}^2)$$

$y_1, \ldots, y_d | z_n = i$ are independent $$y = A_x$$

We convert $z_{n,d}$ into binary variables $\{(z_{n,d,1}, \ldots, z_{n,d,I_d}\}$:

$$z_{n,d,i} = I(z_{n,d} = i).$$

Therefore, $$p(y_n, z_n) = P(y_n | z_n) P(z_n)$$

$$= \prod_{d=1}^{D} \prod_{i=1}^{I_d} \pi_{d,z_{n,d}} G(y_{n,d}, \mu_{d,z_{n,d}}, \sigma_{d,z_{n,d}}^2)$$

$$= \prod_{d=1}^{D} \prod_{i=1}^{I_d} [\pi_{d,i} G(y_{n,d}, \mu_{d,i}, \sigma_{d,i}^2)]^{z_{n,d,i}}$$

We obtain the following complete log likelihood $$L(x, z_n, \theta) =$$

$$\sum_{n=1}^{N} \left\{ \log|A| + \sum_{d=1}^{D} \sum_{i=1}^{I_d} z_{n,d,i} \left[ \log \pi_{d,i} - \frac{1}{2} \log 2\pi \sigma_{d,i}^2 - \frac{(y_{n,d} - \mu_{d,i})^2}{2\sigma_{d,i}^2} \right] \right\}$$

where $\theta = (A, \pi, \mu, \sigma)$.

In the E-step, we compute the auxiliary function $$Q(\theta, \hat{\theta}) = E(L(x, z, \hat{\theta}|x, \theta)$$

$$= \sum_{n=1}^{N} \left\{ \log|A| + \sum_{d=1}^{D} \sum_{i=1}^{I_d} \omega_{n,d,i} \left[ \log \pi_{d,i} - \frac{1}{2} \log 2\pi \sigma_{d,i}^2 - \frac{(y_{n,d} - \mu_{d,i})^2}{2\sigma_{d,i}^2} \right] \right\}$$

where $$\omega_{n,d,i} = E(z_{n,d,i} \mid x_n, \theta) = \frac{\pi_{d,i} G(y_{n,d}, \mu_{d,i}, \sigma_{d,i}^2)}{\sum_{i=1}^{I_d} \pi_{d,i'} G(y_{n,d}, \mu_{d,i'}, \sigma_{d,i'}^2)}.$$

In the M-step, we maximize the auxiliary function Q to update the parameters θ as $$\arg\max_\theta Q(\theta, \hat\theta).$$

From the first order conditions on $(\pi, \mu, \sigma)$, we have $$\pi_{d,i} = \frac{\sum_{n=1}^{N} \omega_{n,d,i}}{\sum_{i=1}^{I_{k,d}} \sum_{n=1}^{N} \omega_{n,d,i}} \tag{3}$$

$$\mu_{d,i} = \frac{\sum_{n=1}^{N} \omega_{n,d,i} y_{n,d}}{\sum_{i'=1}^{I_{k,d}} \sum_{n=1}^{N} \omega_{n,d,i'}} = a_d \mu_{d,i}^{(x)}$$

$$\sigma_{d,i}^2 = \frac{\sum_{n=1}^{N} \omega_{n,d,i}(y_{n,d} - \mu_{d,i})^2}{\sum_{i'=1}^{I_{k,d}} \sum_{n=1}^{N} \omega_{n,d,i'}} = a_d \sum_{d,i}^{(x)} a_d^T$$

where $a_d$ is the d-th row of the matrix A and $$\mu_{d,i}^{(x)} = \frac{\sum_{n=1}^{N} \omega_{n,d,i} x_n}{\sum_{i'=1}^{I_{k,d}} \sum_{n=1}^{N} \omega_{n,d,i'}}$$

$$\sum_{d,i}^{(x)} = \frac{\sum_{n=1}^{N} \omega_{n,d,i}(x_n - \mu_{d,i}^{(x)})(x_n - \mu_{d,i}^{(x)})^T}{\sum_{i'=1}^{I_{k,d}} \sum_{n=1}^{N} \omega_{n,d,i'}}.$$

Let $e_d$ be the column vector which is 1 at the position d:

$$e_d = (0, \ldots, 0, 1, 0, \ldots, 0)^T$$

We obtain the gradient of the auxiliary function with respect to A:

$$\frac{\partial Q}{\partial A} = N(A^{-1})^T - \sum_{n=1}^{N} \sum_{d=1}^{D} \sum_{i=1}^{I_d} \omega_{n,d,i} \frac{y_{n,d} - \mu_{d,i}}{\sigma_{d,i}^2} \frac{\partial y_{n,d}}{\partial A} \tag{4}$$

$$= N(A^{-1})^T - \sum_{n=1}^{N} \sum_{d=1}^{D} \sum_{i=1}^{I_d} \omega_{n,d,i} \frac{y_{n,d} - \mu_{d,i}}{\sigma_{d,i}^2} e_d x_n^T$$

$$= N(A^{-1})^T - \sum_{n=1}^{N} \sum_{d=1}^{D} \sum_{i=1}^{I_d} \omega_{n,d,i} \frac{y_{n,d} - \mu_{d,i}}{\sigma_{d,i}^2} e_d x_n^T$$

$$= N(A^{-1})^T - \sum_{n=1}^{N} \sum_{d=1}^{D} \sum_{i=1}^{I_d} \omega_{n,d,i} \frac{a_d(x_n - \mu_{d,i}^{(x)})}{a_d \sum_{d,i}^{(x)} a_d^T} e_d x_n^T.$$

Notice that this gradient is nonlinear in A. Therefore, solving the first order equations is nontrivial and it requires iterative techniques to optimize the auxiliary function Q.

In the prior art, gradient descent was used to optimize Q, as described by H. Attias, in "Independent Factor Analysis", Neural Computation, Vol. 11, pp. 803–51, May 1999. According to the prior art, the following steps were performed at each iteration:

(1) Fix A and compute the Gaussian mixture parameters $(\pi, \mu, \sigma)$ by (3).

(2) Fix the Gaussian mixture parameters $(\pi, \mu, \sigma)$ and update A via gradient descent using the natural gradient:

$$A = A + \eta \frac{\partial Q}{\partial A} A^T A \tag{5}$$

$$= A + \eta \left( NA - \sum_{n=1}^{N} \sum_{d=1}^{D} \sum_{i=1}^{I_d} \omega_{n,d,i} \frac{y_{n,d} - \mu_{d,i}}{\sigma_{d,i}^2} e_d x_n^T A^T A \right)$$

where η>0 determines the learning rate. The natural gradient is described by S. Amari, in "Natural Gradient Works Efficiently in Learning", Neural Computation, Vol. 10, pp. 251–76, 1998.

According to an embodiment of the present invention, an iterative gradient descent method will now be derived which does not involve the nuisance of determining the stepsize parameter η. At each iteration of the iterative gradient descent method of the invention, for each of the rows of the matrix A:

(1) Fix A and compute the Gaussian mixture parameters $(\pi, \mu, \sigma)$ by (3).

(2) Update each row of A with all the other rows of A and the Gaussian mixture parameters $(\pi, \mu, \sigma)$ fixed. Let $a_j$ be the j-th row; let $c_j=(c_1, \ldots, d_D)$ be the co-factors of A associated with the j-th row. Note that $a_j$ and $c_j$ are both row vectors. Then $$Q = N\log(a_j c_j^T) - \frac{1}{2} \sum_{n=1}^{N} \sum_{d=1}^{D} \sum_{i=1}^{I_d} \frac{\omega_{n,d,i}(a_d x_n - \mu_{d,i})^2}{\sigma_{d,i}^2} + const$$

$$= N\log(a_j c_j^T) - \frac{1}{2} \sum_{d=1}^{D} a_d G_d a_d^T + \sum_{d=1}^{D} a_d h_d^T + const$$

where $$G_d = \sum_{i=1}^{I_d} \frac{1}{\sigma_{d,i}^2} \left( \sum_{n=1}^{N} \omega_{n,d,i} x_n^T x_n \right)$$

$$h_d = \sum_{i=1}^{I_d} \frac{\mu_{d,i}}{\sigma_{d,i}^2} \left( \sum_{n=1}^{N} \omega_{n,d,i} x_n^T \right).$$

Therefore, $$\frac{\partial Q}{\partial a_j} = N \frac{c_j}{a_j c_j^T} - a_j G_j + h_j = 0$$

i.e.

$$a_j = \left( \frac{N}{a_j c_j^T} c_j + h_j \right) G_j^{-1}.$$

Let $$\beta = \frac{N}{a_j c_j^T}.$$

So we have $a_j = (\beta c_j + h_j) G_j^{-1}$ and $$\beta = \frac{N}{(\beta c_j + h_j) G_j^{-1} c_j^T}$$

i.e.

$$\beta^2 c_j G_j^{-1} c_j^T + \beta h_j G_j^{-1} c_j^T - N = 0. \quad (6)$$

Therefore, the j-th row of $a_j$ can be updated as $$a_j = (\beta c_j + h_j) G_j^{-1}$$

where $\beta$ can be solved from the quadratic equation (6).

It is to be appreciated that the iterative Gaussianization method of the present invention increases the auxiliary function Q at every iteration. It would seem that after updating a particular row $a_j$, we are required to go back and update the Gaussian mixture parameters ($\pi$, $\mu$, $\sigma$) to guarantee improvement on Q. However, that is not necessary because of the following two observations:

(1) The update on $a_j$ depends only on $(\pi_{j,i}, \mu_{j,i}, \sigma_{j,i})$ but not on $(\pi_{d,i}, \mu_{d,i}, \sigma_{d,i} : d \neq j)$.

(2) The update on $(\pi_{j,i}, \mu_{j,i}, \sigma_{j,i})$ depends only on $a_j$ but not on $(a_d : d \neq j)$.

Therefore, it is equivalent that we update A, row by row, with the Gaussian parameters fixed and update all the Gaussian mixture parameters in the next iteration.

An EM algorithm for the same estimation problem; referred to as the noiseless independent factor analysis, was described by H. Attias, in "Independent Factor Analysis", Neural Computation, Vol. 11, pp. 803–51, May 1999. The M-step in the algorithm described by Attias involves gradient descent based on natural gradient. In contrast, our M-step involves closed form solution of the rows of A; that is, there is no gradient descent. Since the iterative Gaussianization method of the invention advantageously increases the auxiliary function Q at every iteration, it converges to a local maximum.

A description of iterative Gaussianization transforms for arbitrary random variables according to various embodiments of the present invention will now be given. Convergence results are also provided.

The iterative Gaussianization method of the invention is based on a series of univariate Gaussianization. We parameterize univariate Gaussianization via mixtures of univariate Gaussians, as described above. In our analysis we do not consider the approximation error of univariate variables by mixtures of univariate Gaussians. In other words, we assume that the method uses the ideal univariate. Gaussianization transform rather than its parametric approximation using Gaussian mixtures.

To define and analyze the iterative Gaussianization method of the invention, we first establish some notations and assumptions.

We define the distance between two random variables X and Y to be the Kullback-Leibler distance between their density functions $$D(X \| Y) = D(px \| py) = \int px(w) \log \frac{px(w)}{py(w)} dw$$

where px and py are the densities of X and Y respectively. In particular, we define the negentropy of a random variable X as $$J(X) = D(X \| N(0,I)).$$

It is to be noted that we are taking some slight liberty with the terminology; normally the negentropy of a random variable is defined to be the Kullback-Leibler distance between itself and the Gaussian variable with the same mean and covariance.

In traditional information theory, mutual information is defined to describe the dependency between two random variables. According to the invention, the mutual information of one random variable X is defined to describe the dependence among the dimensions:

$$I(X) = \int px(x_1, \ldots, x_n) \log \frac{px(x_1, \ldots, x_n)}{px_1(x_1) \ldots px_n(x_n)}$$

where $px_d(x_d)$ is the marginal density of $X_d$. Clearly I(X) is always nonnegative and $I(X)=0 \Leftrightarrow X_1, \ldots X_n$ are mutually independent.

A description of six assumptions relating to negentropy and mutual information will now be given, followed by a proof thereof.

First, negentropy can be decomposed as the sum of marginal negentropies and the mutual information. Thus, for the purposes of the invention, assume that for any random variable $X=(x_1, \ldots x_n)^T$, $$J(X) = \sum_{i=1}^{n} J(x_i) + I(X).$$

We shall call the sum of negentropies of each dimension the marginal negentropy $$J_M(X) = \sum_{i=1}^{n} J(x_i).$$

Second, negentropy is invariant under orthogonal linear transforms. Thus, for the purposes of the invention, assume that for any random variable $X \in R^n$ and orthogonal matrix $A_{n \times n}$, $$J(AX) = J(X).$$

This easily follows from the fact that the Kullback-Leibler distance is invariant under invertible transforms:

$$J(AX) = D(AX \| N(0,I)) = D(X \| A^T N(0,I)) = D(X \| N(0,I)) = J(X).$$

Third, let $\Psi$ be the ideal marginal Gaussianization operator which ideally Gaussianizes each dimension. Thus, for the purposes of the invention, assume that for any random variable X, $$J_M(\Psi(X)) = 0.$$

Fourth, mutual information is invariant under any invertible dimension-wise transforms. Thus, for the purposes of the invention, let any random variable $X=(x_1, \ldots x_n)^T$; we transform X by invertible dimension-wise transforms $f_i(x)$ : $R^1 \to R^1$ $y_i = f_i(x_i);$ let $Y=(y_1, \ldots, y_n)^T$ be the transformed variable. Then $I(X)=I(Y).$ Fifth, the $L^1$ distance between two densities is bounded from above by the square root of the Kullback-Leibler distance. Thus, for the purposes of the invention, let f(x) and g(x) be two n-dimensional density functions, then $\int |f(x)-g(x)|dx \leq [2D(f\|g)]^{1/2}.$ Sixth, a weak convergence result is proved on random variables, similar to Proposition 14.2 described by P. J. Huber, in "Projection pursuit", Annals of Statistics, Vol. 13, pp. 435–525, April 1985. Thus, for the purposes of the invention, let X and $(X^{(1)}, X^{(2)}, \ldots)$ be random variable in $R^n$; then $$\limsup_{k \to \infty, \|\alpha\|_2 = 1} D(\alpha^T X^{(k)} \| \alpha^T X) = 0,$$

implies $X^{(k)} \to X$ weakly.

Regarding the proof of the six assumptions above, let $p^{(k)}$, p, $p_\alpha^{(k)}$, $p_\alpha$ be the density functions of $X^{(k)}$, Y, $\alpha^T X^{(k)}$, $\alpha^T Y$ respectively. By the fifth assumption, we have:

$$\sup_{\|\alpha\|_2=1} \int |p_\alpha^{(k)} - p_\alpha| \leq \sup_{\|\alpha\|_2=1} [2D(p_\alpha^{(k)}\|p_\alpha)]\frac{1}{2} \to 0.$$

Hence, the characteristic functions $\psi_\alpha^{(k)}$ of $p_\alpha^{(k)}$ converge uniformly to the characteristic function $\psi_\alpha$ of $p_\alpha$:

Let $\psi^{(k)}$ and $\Psi$ be the characteristic functions of the joint densities $p^{(k)}$ and p, respectively. The marginal characteristic functions can be related to the joint characteristic functions as $\psi_\alpha(\theta) = Ee^{i\theta\alpha^T X} = Ee^{i(\theta\alpha)^T X} = \psi(\theta\alpha).$ Therefore, $\sup_{\alpha,\theta} |\psi_\alpha^{(k)}(\theta) - \psi_\alpha(\theta)| \ \sup_{\alpha,\theta} |\psi^{(k)}(\theta\alpha) - \psi(\theta\alpha)| \to 0.$ In particular by setting $\theta=1$, $\sup_\alpha |\psi^{(k)}(\alpha) - \psi(\alpha)| \to 0,$ i.e., the characteristic functions of $X^{(k)}$ converge uniformly to the characteristic function of X. Therefore $X^{(k)}$ converges weakly to X, by the continuity theorem of characteristic functions, i.e., the densities $p^{(k)}$ converge to p pointwise at every continuous point of p.

A description of the iterative Gaussianization method a of the present invention will now be given. Let $X=(x_1, \ldots, x_n)^T$ be an arbitrary random variable. We intend to find an invertible transform $T:R^n \to R^n$ such that T(X) is distributed as the standard Gaussian, i.e. we would like to find T such that $J(T(X))=0.$ (7)

When X is assumed to have independent components after certain linear transforms, we have constructed the Gaussianization transform above via the EM algorithm:

$T_\theta(X) = \Psi_{\phi,\mu,\sigma}(AX),$ where the parameters $\theta=(A,\pi,\mu,\sigma)$ and $\Psi_{\phi,\mu,\sigma}$ is the Marginal Gaussianization operator parameterized by univariate Gaussian mixture models that Gaussianizes each individual dimension as per equation (2). Clearly, when the number of Gaussian components goes to infinity, we achieve perfect Gaussianization $$\lim_{l_1, \ldots, l_n \to \infty} J(T_\theta(X)) = 0.$$

For the arbitrary random variable X, $T_\theta$ does not necessarily achieve Gaussianization. However, we can still run the same maximum likelihood EM algorithm. In fact, if we iteratively apply $T_\theta$, we can prove that $T_\theta$ achieves Gaussianization. More specifically, let $X^{(0)}=X$; let $X^{(k+1)}=T_{\theta^{(k)}}(X^k),$ (8)

where the parameters $\theta^{(k)}$ are estimated from the data associated with the k-th generation $X^k$. We shall prove that $X^{(k)}$ converges to the standard normal distribution.

A description of the relationship of iterative Gaussianization to maximum likelihood will now be given. We first show that the maximum likelihood EM method of the invention described above actually minimizes the negentropy distance $$\min_{T_\theta} J(T_\theta(X)).$$ (9)

Let X, Y$\in R^n$ be two random variables; let $T_\theta:R^n \to R^n$ be a parameterized invertible transform with parameters $\theta$. Then, finding the best transform $$\min_\theta D(T_\theta(X)\|Y)$$

is equivalent to maximizing a likelihood function which is parameterized by $\theta$:

$$\max_\theta E_X(\log p_\theta(X)),$$

where the density model $p_\theta(x)$ is the density of $T^{-1}(Y)$. This easily follows from $D(T_\theta(X)\|Y)=D(X\|T_\theta^{-1}(Y))=H(X)-E_x(\log p_\theta(X)).$ A convergence proof will now be given regarding the iterative Gaussianization method of the invention. We now analyze the Gaussianization process $X^{(k)} \xrightarrow{A} Y^{(k)} \xrightarrow{\Psi_{\pi,\mu,\sigma}} X^{(k+1)}$ where the linear transform A and the marginal Gaussianization parameters $\{\pi, \mu, \sigma\}$ are obtained by minimizing the negentropy of $X^{(k+1)}$. For the sake of simplicity, we assume that we can achieve perfect univariate Gaussianization for any univariate random variable. In fact, when the number of Gaussians goes to infinity, it can be shown that the univariate Gaussianization parameterized by mixtures of univariate Gaussians above indeed converges. Therefore, in our convergence analysis, we do not consider the approximation error of univariate variables by mixtures of univariate Gaussians. We assume the perfect marginal Gaussianization center $\Psi$ is available which does not need to be estimated. We shall analyze the ideal iterative Gaussianization procedure $$X^{(k)} \xrightarrow{A} Y^{(k)} \xrightarrow{\Psi} X^{(k+1)}$$

where the linear transform A is obtained by minimizing the negentropy of $X^{(k+1)}$. Obviously, if the ideal iterative procedure converges, the actual iterative procedure also converges, when the number of univariate Gaussians goes to infinity.

From the first and third assumptions above, it is clear that the negentropy of $X^{(k+1)}$ is $$J(X^{(k+1)})=J_M(\Psi(AX^{(k)}))+I(\Psi(AX^{(k)}))=I(AX^{(k)}).$$

Therefore, the iterative Gaussianization process attempts to linearly transform the current variable $X^{(k)}$ to the most independent view:

$$\min_A J(\Psi(AX^{(k)})) \Leftrightarrow \min_A I(AX^{(k)}).$$

We now prove the convergence of the iterative Gaussianization method of the invention. Our proof resembles the proof of convergence for projection pursuit density estimates described by P. J. Huber, in "Projection Pursuit", Annals of Statistics, Vol. 13, pp. 435–525, April 1985. Let $\Delta_k$ be the reduction in the negentropy in the k-th iteration:

$$\Delta^{(k)} = J(X^{(k)}) - J(X^{(k+1)}) = I(X^{(k)}) - \inf_A I(AX^{(k)}).$$

Since $\{J(X^{(k)})\}$ is a monotonically decreasing sequence and bounded from below by 0, we have $$\lim_{k \to \infty} \Delta^{(k)} = 0.$$

In fact, for any given $\epsilon>0$, it takes at most $k=J(X^{(0)})/\epsilon$ to reach a variable $X^{(k)}$ such that $\Delta^{(k)} \leq \epsilon$.

Following the argument presented in the immediately preceding article by Huber, the maximum marginal negentropy is defined as $$J*(X) = \sup_{\|\alpha\|_2=1} J(\alpha^T X).$$

Clearly, $J(X^{(k)}) \to 0$ implies $J*(X^{(k)}) \to 0$. However, the reverse is not necessarily true. We shall show that the maximum marginal negentropy of $X^{(k)}$ is bounded from above by $\Delta^{(k)}$. For any unit vector $\alpha(\|\alpha\|_2=1)$, let $U_\alpha$ be an orthogonal completion of $\alpha$:

$$U_\alpha=[\alpha,\alpha_2,\ldots,\alpha_n].$$

Applying the first and second assumptions above, we have $$J(\alpha^T X^{(k)}) \leq J_M(U_\alpha^T X^{(k)}) = I(U_\alpha^T X^{(k)}) = J(X^{(k)}) - I(U_\alpha^T X^{(k)}).$$

Therefore, $$\sup_{\|\alpha\|_2=1} J(\alpha^T X^{(k)}) \leq I(X^{(k)}) - \inf_{U_\alpha} I(U_\alpha X^{(k)}) \leq I(X^{(k)}) - \inf_{arbitrary A} I(AX^{(k)})$$

i.e., $$J*(X^{(k)}) \leq \Delta^{(k)}.$$

Since $\Delta^{(k)} \to 0$, we have $$J*(X^{(k)}) \to 0.$$

Applying the sixth assumption, we can now establish our convergence result.

For iterative Gaussianization as in equation (8), $$X^{(k)} \to N(0,I)$$

in the sense weak convergence, i.e., the density function of $X^{(k)}$ converges pointwise to the density function of standard normal.

A description will now be given of how the iterative Gaussianization method of the invention can be viewed as a parametric generalization of high dimensional projection pursuit.

A nonparametric density estimation scheme called projection pursuit density estimation is described by Friedman et al., in "Projection Pursuit Density Estimation", J. American Statistical Association, Vol. 79, pp. 599–608, September 1984. Its convergence result was subsequently proved by P. J. Huber, in "Projection Pursuit", Annals of Statistics, Vol. 13, pp. 435–525, April 1985. In this scheme, the density function f(x) of a random variable $X \in R^n$ is approximated by a product of ridge functions $$p_k(x) = p_0(x) \prod_{j=1}^{k} h_j(\alpha_j^T x)$$

where $p_0(x)$ is some standard probability density in $R^n$ (e.g. a normal density with the same and covariance as p(x)). At each iteration (k+1), the update $h_{k+1}$ can be obtained by $$h_{k+1}(x)=p(\alpha_{k+1}^T x)/p_k(\alpha_{k+1}^T)$$

where the direction $\alpha_{k+1}$ is constrained to have unit length $\|\alpha_{k+1}\|_2=1$ and can be computed by $$\alpha_{k+1} = \operatorname*{argmax}_\alpha D(p(\alpha^T x) \| p_k(\alpha^T x)) \qquad (10)$$

It has been suggested to estimate the marginal densities $p(\alpha^T x)$ of the data by histograms or kernel estimates with the observed samples and to estimate the marginal density $p_k(\alpha^T x)$ of the current model by histograms or kernel estimates with Monte Carlo samples, then to optimize (as in equation 10) by gradient decent. These suggestions are made by: Friedman et al., in "Projection Pursuit Density Estimation", J. American Statistical Association, Vol. 79, pp. 599–608, September 1984; and P. J. Huber, in "Projection Pursuit", Annals of Statistics, Vol. 13, pp. 435–525, April 1985. In our view, this scheme attempts to approximate the multivariate density by a series of univariate densities; the scheme finds structures in the domain of density function. However, since there is no transforms involved, the scheme does not explicitly find structures in the data domain. In addition, the kernel estimation, the Monte Carlo sampling, and the gradient decent can be quite cumbersome.

Data is explicitly transformed by the exploratory projection pursuit described by J. H. Friedman, in "Exploratory Projection Pursuit", J. American Statistical Association, Vol. 82, pp. 249–66, March 1987. Let $X^{(0)}$ be the original random variable. At each iteration, the most non-Gaussian projection of the current variable $X^{(k)}$ is found:

$$\alpha_k = \arg\min_\alpha D(\alpha^T X^{(k)} \| G_\alpha)$$

where $G_\alpha$ is the univariate Gaussian random variable with the same mean and covariance as $\alpha^T X^{(k)}$. Let U be an orthogonal matrix with $\alpha_k$ being its first column $$U = [\alpha_k \ldots].$$

One then transforms $X^{(k)}$ into the U domain:

$$Y = U^T X^{(k)}.$$

The first coordinate of Y is Gaussianized, and the remaining coordinates are left unchanged:

$$z_1 = \Psi(y_1)$$

$$z_d = y_d, d = 2, \ldots, n$$

One obtains $X^{(k+1)}$ as $$X^{(k+1)} = UZ$$

If we denote $\Psi_1$ as the operator which Gaussianizes the first coordinate and we leave the remaining coordinates unchanged, then we have $$X^{(k+1)} = U\Psi(U^T X^{(k)})$$

The two dimensional exploratory projection pursuit was also described by J. H. Friedman, in "Exploratory Projection Pursuit", J. American Statistical Association, Vol. 82, pp. 249–66, March 1987. According to the two dimensional exploratory projection pursuit, at each iteration, one locates the most jointly non-Gaussian two dimensional projection of the data and then jointly Gaussianizes that two dimensional plane. To jointly Gaussianize a two dimensional variable, rotated (about the origin) projections of the two dimensional plane are repeatedly Gaussianized until it becomes like normal. More specifically, let $Y = (y_1, y_2)^T$ be the two dimensional plane which is most non-Gaussian.

Let $$y'_1 = y_1 \cos\gamma + y_2 \sin\gamma$$

$$y'_2 = y_2 \cos\gamma + y_1 \sin\gamma$$

be a rotation about the origin through angle $\gamma$. $y'_1$ and $y'_2$ can then be Gaussianized individually. This process is repeated (on the previously rotated variables) for several values of $\gamma = (0, \pi/8, \pi/4, 3\pi/8, \ldots)$. This entire process is then repeated until the distributions stop becoming more normal.

The iterative Gaussianization method of the invention can be easily modified to achieve high dimensional exploratory projection pursuit with efficient parametric optimization. Assume that we are interested in l-dimensional projections where $1 \le l \le n$. The modification will now be described. At each iteration, instead of marginally Gaussianizing all the coordinates of $AX^{(x)}$, we marginally Gaussianize the first l coordinates only:

$$X^{(k+1)} = \Psi^l(AX^{(k)}) \quad (11)$$

where the operator $\Psi^l$ marginally Gaussianizes the first l coordinates and leaves the remaining coordinates fixed; A is obtained by minimizing the negentropy of $X^{(k+1)}$:

$$\min_A J(\Psi^l(AX^{(k)})) \quad (12)$$

In practice, we estimate the ideal operator $\Psi^l$ by mixtures of univariate Gaussians as described above. For $X \in R^n$, we define $$\Psi^l(X) = (\Psi_1^{\,l}(x_1) \ldots \Psi_n^{\,l}(x_n))$$

where $$\Psi_d^l(x_d) = \Phi^{-1}\left(\sum_{i=1}^{l_d} \pi_{d,i} \Phi\left(\frac{x_d - \mu_{d,i}}{\sigma_{d,o}}\right)\right) \quad \forall\, 1 \le d \le l$$

$$\Psi_d^{\,l}(x_d) = x_d \,\forall\, l+1 \le d \le n$$

This is equivalent to assuming that X has the following distribution:

$$px(x_1, \ldots, x_n) = \left[\prod_{d=1}^{l} \sum_{i=1}^{l_d} \pi_{d,i} G(x_d, \mu_{d,i}, \sigma_{d,i})\right] \times \left[\prod_{d=l+1}^{n} G(x_d, 0, 1)\right]$$

Therefore, the EM method of the invention described above can be easily accommodated to model $\Psi^l$ by setting the number of univariate Gaussians in dimensions l+1 through n to be one:

$$I_d = 1 \,\forall\, l+1 \le d \le n.$$

A description of a constrained version of the iterative Gaussianization method of the invention will now be given. To first whiten the data and then consider only orthogonal projections for two dimensional projection pursuit has been described by J. H. Friedman, in "Exploratory Projection Pursuit", J. American Statistical Association, Vol. 82, pp. 249–66, March 1987. Here, the same assumption is made; we constrain the linear transform A to be a whitening transform W followed by an orthogonal transform U $$A = UW$$

where the whitening matrix W whitens the data $X^{(k)}$ $$\text{Var}(WX^{(k)}) = 1.$$

For example, W can be taken as $$W = \text{Var}(X^{(k)})^{-\frac{1}{2}}.$$

We partition U as $$U + \begin{pmatrix} U_1 \\ U_2 \end{pmatrix}$$

where $U_1$ are the first l rows. Let $Y^{(k)}$ be the whitened variable $Y^{(k)} = WX^{(k)}$. Applying the first, third, and second assumptions above, we have $$J(\Psi^l(UY^{(k)})) = J_M(\Psi^l(UY^{(k)})) + I(\Psi^l(UY^{(k)}) = J_M(U_2Y^{(k)}) + I(UY^{(k)})$$

and $$J(Y^{(k)}) = J(UY^{(k)}) = J_M(UY^{(k)}) + I(UY_{(k)}).$$

Taking the difference, we have $$J(Y^{(k)}) - J(\Psi^1(UY^{(k)})) = J_M(U_1 Y^{(k)}).$$

Therefore, the modified iterative Gaussianization method (11) with the constraint $$A = UW$$

is equivalent to finding the 1-dimensional marginally most non-Gaussian orthogonal projection of the whitened data. Let $\hat{U}_1$ be the 1-dimensional marginally most non-Gaussian orthogonal projection of the whitened data:

$$\hat{U}_1 = \arg\max U_1 J_M(U_1 W X^{(k)}).$$

Let $\hat{U}$ be any orthogonal completion of $\hat{U}_1$:

$$\hat{U} = \begin{pmatrix} \hat{U}_1 \\ \hat{U}_2 \end{pmatrix}.$$

Then $\hat{U}$ is a solution of the constrained modified iterative Gaussianization procedure $$\min_{A=UW} J(\Psi^l(AX^{(k)})).$$

The EM method of the invention must be modified to accommodate for the orthogonality constraint on the linear transform. Since the original EM method of the invention estimates each row of the matrix, it cannot be directly applied here. We propose using either the well-known Householder parameterization or Given's parameterization for the orthogonal matrix and modifying the M-step accordingly.

The weak convergence result of this constrained modified iterative Gaussianization can be easily established by deriving the key inequality $$J^*(X^{(k)}) \leq \Delta^{(k)} = J_M(U_1 W X^{(k)})$$

and following the same proof described above with respect to convergence. Obviously for the larger l, the convergence is faster, since $\Delta^{(k)}$, the improvement at iteration k, is larger.

Friedman's high dimensional exploratory projection algorithm attempts to find the most jointly non-Gaussian 1 dimensional projection. The computation of the projection index involves high dimensional density estimation. In contrast, the Gaussianization method of the invention tries to find the most marginally non-Gaussian 1 dimensional projection; it involves only univariate density estimation.

The bottleneck of 1-dimensional exploratory projection pursuit is to Gaussianize the most jointly non-Gaussian 1-dimensional projection into standard Gaussian, as described by J. H. Friedman, in "Exploratory Projection Pursuit", J. American Statistical Association, Vol. 82, pp. 249–66, March 1987. In contrast, the Gaussianization method of the invention involves only univariate Gaussianization and can be computed by an efficient EM algorithm.

A description of an unconstrained version of the iterative Gaussianization method of the invention will now be given. If we do not employ the orthogonality constraint and we solve the more general problem (as per equation 12), we would get faster convergence, and the original EM method of the invention can be used without any modification. At each iteration, since $$J(\Psi1(AX^{(k)})) = J_M(\Psi^1(AX^{(k)})) + I(\Psi(AX^{(k)}) = J_M(A_2 X^{(k)}) + I(AX^{(k)}),$$

where $A_2$ consists of the last (n−1) rows of A, we can also argue that this unconstrained procedure attempts to find the most independent view in which the 1 most marginally non-Gaussian directions can be chosen.

A description of hierarchical independence pursuit according to an embodiment of the invention will now be given. In the construction of probabilistic models for high dimensional random variables, it is crucial to find the independence or conditional independence structures present in the data. For example, if we know that the random variable $X \in R^n$ can be separated into two variables $X = (X_1 X_2)$ such that $X_1 \in R^{n_1}$ is independent of $R^{n_2}$, we can then construct probabilistic models separately for $X_1$ and $X_2$, which can be much simpler than the original problem.

We attempt to transform the original variable to reveal independence structures. The iterative Gaussianization method of the invention can be viewed as independent pursuit, since when it converges, we have reached a standard normal variable, which is obviously independent dimension-wise. Moreover, the iterative Gaussianization method of the invention can be viewed as finding independent structures in a hierarchical fashion.

We first analyze the ability of finding independent structures at each Gaussianization iteration. We have shown above that each step of Gaussianization minimizes the mutual information $$\min_A I(AX^{(k)}) \tag{13}$$

If there exists a linear transform such that the transformed variable can be separated into independent sub variables, then our minimization of the mutual information will find that independent structure. This is precisely the problem of Multidimensional Independent Component Analysis proposed by J.-F. Cardoso, in "Multidimensional Independent Component Analysis", Proceedings of ICASSP '98, Seattle, Wash., May 1998. It is a generalization of the independent component analysis, where the components are independent of one another but not necessarily one dimensional. We call a random variable $X \in R^n$ minimal if any linear transform on X does not reduce the mutual information $$I(AX) = I(X), \forall A$$

and all the dimensions of the transformed variable Y are dependent. From the description provided by Cardoso in the immediately preceding article, we have the following result that minimizing the mutual information (13) finds the underlying minimal structure.

Let $Y = (Y_1, \ldots, Y_M)$ where each $X_i \in R^{n_i}$ is minimal. Let the observed variable X be a certain linear transform of Y: $X = BY$. Then, the solution of minimizing the mutual information is $$B^{-1} = \arg\min_A I(AX).$$

The iterative Gaussianization method of the invention induces independent structures which can be arranged hierarchically as a tree. Assume that at the k-th iteration, $X^{(k)}$ has multidimensional independent components $X^{(k)} = (X_1^{(k)}, \ldots, X_m^{(k)})^T$, where each multidimensional component $X_j^{(k)}$ is in $R^{nj}$ and $\Sigma_{j=1}^m n_j = n$. It can be easily shown that the next iteration of Gaussianization is equivalent to running one iteration of Gaussianization on each individual multidimensional component $X_j^{(k)}$.

If X has multidimensional independent components $X=(X_1, \ldots, X_m)$, then $$\operatorname*{argmin}_{A} J(\Psi(AX)) \Leftrightarrow \operatorname*{argmin}_{A_j} J(\Psi(A_j X_j)) \forall\, 1 \le j \le m.$$

Therefore, the iterative Gaussianization method of the invention can be viewed as follows. We run iterations of Gaussianization on the observed variable until we obtain multidimensional independent components; we then run iterations of Gaussianzation on each multidimensional independent component; and we repeat the process. This induces a tree which describes the independence structures among the observed random variable $X \in R^n$. The tree has n leaves. Each leaf l is associated with its parents and grandparents and so on:

$$X_l X_{l\uparrow} X_{l\uparrow\uparrow} \ldots X_{root}$$

where $n\uparrow$ denotes the parent node of n and $X_{root}$ is the observed variable X. In this tree, all the children of a particular node are obtained by running iterations of Gaussianization until we obtain multidimensional independent components; the multidimensional independent components are the children.

In practice, we need to detect the existence of multidimensional independent components. Accordingly, we provide two relevant methods. The first method is based on the fact that if $X=(x_1, \ldots, x_n)$ has multidimensional independent components $X=(X_1, \ldots, X_m)$, then the matrix A, which we obtain by running one iteration of Gaussianization on X $$\min_{A} I(AX),$$

will be block diagonal. More specifically, we have $A_{ij}=0$ if $x_i$ is independent of $x_j$. Therefore, we define the distance between dimension i and j to be the absolute value of $A_{ij}$ $$d_{ij}=|A_{ij}|$$

and run the bottom-up hierarchical clustering scheme with maximum linkage. We can obtain an estimate of the multidimensional independent components by applying thresholding on the clustering tree with a threshold level $\epsilon>0$.

The second method is also based on bottom-up hierarchical clustering with maximum linkage; however, the distance between dimension i and j is defined to reflect the dependency between $X_i$ and $x_j$, such as the Hoeefding statistics, the Blum-kiefer-Rosenblatt statistics, or the Kendall's rank correlation coefficient, as described by H. Wolfe, Nonparametric Statistical Methods, Wiley, 1973. These statistics are designed to perform a nonparametric test of the independence of two random variables. The threshold level $\epsilon$ can be chosen according to the significant level of the corresponding independence test statistics.

The above scheme is also applicable for the purpose of speeding up the iterative Gaussianization method of the invention. Once we achieve multidimensional independent components, we can now run iterations of Gaussianization on the individual multidimensional independent components instead of the entire dimensions, since Gaussianizing a lower dimensional variable is computationally advantageous.

A description of density estimation via Gaussianization according to the invention will now be given. As stated above, Gaussianization can be viewed as density estimation. In particular, our parameterized Gaussianization discussed above can be viewed as parametric density estimation. We now describe two forms of density estimates based on Gaussianization according to the invention:

(1) Iterative Models which can be directly obtained from the iterative Gaussianization method of the invention described above.

(2) Mixture Models in which each cluster corresponds to one iteration of Gaussianization.

A description of iterative Gaussianization densities according to the invention will now be given. Consider the sequence of optimal parametric Gaussianization transformations $T_{\theta_k}$ (as described above) acting on a random variable $X=X^{(0)}$. Since the sequence $X^{(k)}=T_{\theta_k}X^{(k-1)}$ converges to a standard normal distribution, for sufficiently large k, $X^{(k)}$ is approximately Gaussian. Since the transformations $T_{\theta_k}$ are all invertible, a standard normal density estimate for $X^{(k)}$ implies a density estimate for X. Indeed, if we define for each k $$Y^{(k)}=T_{\theta_1}^{-1} T_{\theta_2}^{-1} \ldots T_{\theta_k}^{-1} N \tag{14}$$

where $N \sim N(0, I)$, then the density of $Y^{(k)}$ can be considered a parametric estimate of the density of X for each k. The larger k, the better the estimate. If $H_{\theta_k}(y^{(k)})$ denotes the Jacobian determinant of $T_{\theta_k}$ evaluated at $y^{(k)}$, i.e., $$H_{\theta_k}(y^{(k)}) = \left|\frac{\partial T_{\theta_k} Z}{\partial Z}\right|_{Z=y^{(k)}}$$

then, the probability distribution of $Y^{(k)}$ is given by $$p(y^{(k)}) = \frac{1}{\sqrt{(2\pi)^p}} H_{\theta_k}(y^{(k)}) \ldots H_{\theta_2}(y^{(2)}) H_{\theta_1}(y^{(1)}) \exp\left(-\frac{1}{2}\|T_{\theta_k} \ldots T_{\theta_1} y^{(k)}\|^2\right) \tag{15}$$

Essentially, for each k, $Y^{(k)}$ comes from a parametric family #of densities, for example $-_k$, defined by Equation 15.

The iterative Gaussianization method of the invention can be viewed as an approximation process where the probability distribution of X, e.g., p(x), is approximated in a product form (Equation 15). In particular, if p(x) belongs to one of the families, e.g., $-_k$, then it has an exact representation.

A description of mixtures of Gaussianizations will now be given. The family $-_1$ will be called linearly transformed Compound Gaussians, and is closely related to Independent Component Analysis. $-_1(\theta)$ with the restriction that the linear transform A=I will be called Compound Gaussians. Clearly $X=\{x_1, \ldots, x_D\}$ is a compound Gaussian if the dimensions $x_d$'s are independent and each dimension $x_d$ is a Gaussian mixture $$f(x_d) = \sum_{i=1}^{l_d} \pi_{(d,i)} G(x_d, \mu_{(d,i)}, \sigma^2_{(d,i)})$$

The density of a compound Gaussian can be written as:

$$f(x_1, \ldots, x_D) = \prod_{d=1}^{D} \sum_{i=1}^{l_d} \pi_{(d,i)} G(x_d, \mu_{(d,i)}, \sigma^2_{(d,i)}) \tag{16}$$

Compound Gaussians are closely related to Gaussian mixtures. The definition (equation 16) can be expanded as a sum of product terms:

$$f(x_1, \ldots, x_D) = \sum_{i_1 \ldots i_d} \prod_{d=1}^{D} \pi_{(d,i_d)} G(x_d, \mu_{(d,i_d)}, \sigma^2_{(d,i_d)}). \quad (17)$$

Compound Gaussians diagonal covariance Gaussian mixtures with I mixture components:

$$I = \prod_{d=1}^{D} I_d.$$

Note that a mixture of $$\left(\prod_{d=1}^{D} I_d\right)$$

diagonal Gaussians has $$(2D+1)\prod_{d=1}^{D} I_d - 1$$

free parameters. However, in the equivalent definition of the compound Gaussians (as per equation 17), the priors, means and variances are constrained in a particular fashion such that the number of effective free parameters is merely $$\sum_{d=1}^{D} (3I_d - 1).$$

The compound Gaussian distribution is specifically designed for multivariate variables which are independent dimension-wise while non-Gaussian in each dimension. In such cases, modeling as mixtures of diagonal Gaussians would be extremely inefficient.

However, compound Gaussians are not able to describe the dependencies among the dimensions, whereas mixtures of diagonal Gaussians can. To accommodate for the dependencies, one may consider mixtures of Compound Gaussians, which is a generalization of mixtures of diagonal Gaussians.

Gaussianization leads to a collection of families $-_k\theta$ of probability densities. These densities can be further generalized by considering mixtures over $-_k$. We have already seen that compound Gaussians ($\subset -_1(.)$) are not able to describe dependencies between dimensions, while mixtures of Compound Gaussians can, illustrating that this generalization can sometimes be useful.

A description of an EM method for training the mixture of compound Gaussians according to an embodiment of the invention will now be given. Let $\{x_n \epsilon R^D: 1 \leq n \leq N\}$ be the training set; assume they are independently and identically distributed as a mixture of compound Gaussians:

$$f(x) = \sum_{k=1}^{K} \rho_k \prod_{d=1}^{D} \sum_{i=1}^{I_{k,d}} \pi_{k,d,i} G(x_d, \mu_{k,d,i}, \sigma^2_{k,d,i})$$

Let $(x_n \epsilon R^D, u_n \epsilon N, z_n \epsilon N^D: n=1, \ldots, N)$ be the complete data, where $u_n$ indicates the index of the compound Gaussian, and $z_n = (z_{n,1} \ldots z_{n,D})$ are the indexes of the particular Gaussian along all the dimensions. It is clear that $$u_n \sim \text{Multinomial}(1, (\rho_1, \ldots, \rho_K)).$$

$$z_{n,d}|u_n = k \sim \text{Multinomial}(1, \pi_{k,d,1}, \ldots, \pi_{k,d,I_d}))$$

$$x_d|u_n = k, z_{n,d} = i \sim N(x_d, \mu_{k,d,i}, \sigma_{k,d,i}^2)$$

$$x_1, \ldots, x_d|u_d = k, z_{n,d} = i$$

are independent

We convert $u_n$ into binary variables $\{u_{n,1}, \ldots, u_{n,K}\}$:

$$u_{n,k} = I(u_n = k)$$

Similarly we define $$z_{n,d,i} = I(z_{n,d} = i)$$

Therefore, $$p(x_n, u_n, z_n) = p(u) p(z|u) p(x|u, z) =$$

$$\prod_{k=1}^{K} \left\{ p_k \prod_{i=1}^{I_{k,d}} [\pi_{k,d,i} G(x_d, \mu_{k,d,i}, \sigma^2_{k,d,i})]^{z_{n,d,i}} \right\}^{u_{n,k}}$$

We obtain the following complete log likehood $$L(x, u, z, \theta) = \sum_{n=1}^{N} \sum_{k=1}^{K} u_{n,k}$$

$$\left\{ \log \rho_k + \sum_{i=1}^{I_{k,d}} z_{n,d,i} \left[ \log \pi_{k,d,i} - \frac{1}{2} \log 2\pi \sigma^2_{k,d,i} - \frac{(x_{n,d} - \mu_{k,d,i})^2}{2\sigma^2_{k,d,i}} \right] \right\}$$

where $\theta = (\rho, \pi, \mu, \sigma)$.

In the E-step, we compute the auxiliary function $$Q(\theta, \hat{\theta}) = E(L(x, u, z, \hat{\theta})|x, \theta = \sum_{n=1}^{N} \sum_{k=1}^{K} \left\{ w_{n,k} \log \hat{\rho}_k + \right.$$

$$\left. \sum_{i=1}^{I_{k,d}} w_{n,k,i} \left[ \log \hat{\pi}_{k,d,i} - \frac{1}{2} \log 2\pi \hat{\sigma}^2_{k,d,i} - \frac{(x_{n,d} - \hat{\mu}_{n,d,i})^2}{2\hat{\sigma}^2_{k,d,i}} \right] \right\}$$

where $$w_{n,k} = E(u_{n,k}|x_n, \theta) = \frac{\rho_k \prod_{d=1}^{D} \sum_{i=1}^{I_{k,d}} \pi_{k,d,i} G(x_{n,d}, \mu_{k,d,i}, \sigma^2_{k,d,i})}{\sum_{k'=1}^{K} \rho_{k'} \prod_{d'=1}^{D} \sum_{i'=1}^{I_{k',d'}} \pi_{k',d',i'} G(x_{n,d}, \mu_{k',d',i'}, \sigma^2_{k',d',i'})}$$

$$w_{n,k,d,i} = E(u_{n,k} z_{n,d,i}|x_n, \theta) =$$

$$\frac{\rho_k \pi_{k,d,i} \prod_{d' \neq d} \sum_{i=1}^{I_{k,d'}} \pi_{k,d',i} G(x_{n,d'}, \mu_{k,d',i}, \sigma^2_{k,d',i})}{\sum_{k'=1}^{K} \rho_{k'} \prod_{i'=1}^{I_{k',d'}} \pi_{k',d',i'} G(x_{n,d}, \mu_{k',d',i'}, \sigma^2_{k',d',i'})}$$

In the M-step, we maximize the auxiliary function Q to update the parameter estimation $$\hat{\theta} = \arg \max_\theta Q(\theta, \hat{\theta})$$

Here are the updated formulas:

$$\hat{\rho}_k = \frac{\sum_{n=1}^{N} w_{n,k}}{\sum_{k'=1}^{K}\sum_{n=1}^{N} w_{n,k'}}$$

$$\hat{\pi}_{k,d,i} = \frac{\sum_{n=1}^{N} w_{n,k,d,i}}{\sum_{i'=1}^{l_{k,d}}\sum_{n=1}^{N} w_{n,k,d,i'}}$$

$$\hat{\mu}_{k,d,i} = \frac{\sum_{n=1}^{N} w_{n,k,d,i} x_{n,d}}{\sum_{i'=1}^{l_{k,d}}\sum_{n=1}^{N} w_{n,k,d,i'}}$$

$$\hat{\sigma}^2_{k,d,i} = \frac{\sum_{n=1}^{N} w_{n,k,d,i}(x_{n,d}-\hat{\mu}_{k,d,i})^2}{\sum_{i'=1}^{l_{k,d}}\sum_{n=1}^{N} w_{n,k,d,i'}}$$

A description will now be given of mixtures of compound Gaussians with linear transforms (i.e., $-_1$-Mixtures). Let $x_{D\times 1}\epsilon R^D$ be the random variable we are interested in. Assume that after a linear transform A, the transformed variable $y=Ax$ can be modeled as a mixture of compound Gaussians:

$$f(y) = \sum_{k=1}^{K} \rho_k \prod_{d=1}^{D} \sum_{i=1}^{l_{k,d}} \pi_{k,d,i} G(x_d, \mu_{k,d,i}, \sigma^2_{k,d,i})$$

We describe here an EM method according to the invention to estimate both the transform matrix A and the compound Gaussian model parameters. Let $\{x_n \epsilon R^D : 1\leq n \leq N\}$ be the training set. Let $\{y_n = Ax_n : 1 \leq n \leq N\}$ be the transformed data. Let $(y_n \epsilon R^D, x_n \epsilon R^D, u_n \epsilon N, z_n \epsilon N^D : n=1, \ldots, N)$ be the complete data, where $u_n$ indicates the index of the compound Gaussian, and $z_n = (z_{n,1} \ldots z_{n,D})$ are the indexes of the particular Gaussian along all the dimensions. We obtain the following complete log likelihood $$L(x, u_n, z_n, \theta) = N \log|A| + \sum_{n=1}^{N}\sum_{k=1}^{K} u_{n,k}$$

$$\left\{ \log\rho_k + \sum_{i=1}^{l_{k,d}} z_{n,d,i} \left[ \log\pi_{k,d,i} - \frac{1}{2}\log 2\pi\sigma^2_{k,d,i} - \frac{(y_{n,d}-\mu_{k,d,i})^2}{2\sigma^2_{k,d,i}} \right] \right\}$$

where $\theta = (A, \rho, \pi, \mu, \sigma)$.

In the E-step, we compute the auxiliary function $$Q(\theta, \hat{\theta}) = E(L(x, u, z, \hat{\theta})|x, \theta = N \log|A| + \sum_{n=1}^{N}\sum_{k=1}^{K} \left\{ w_{n,k}\log\rho_k + \right.$$

$$\left. \sum_{i=1}^{l_{k,d}} w_{n,k,i}\left[\log\pi_{k,d,i} - \frac{1}{2}\log 2\pi\sigma^2_{k,d,i} - \frac{(y_{n,d}-\mu_{k,d,i})^2}{2\sigma^2_{k,d,i}}\right]\right\}$$

where $$w_{n,k} = E(u_{n,k}|y_n, \theta) = \frac{\rho_k \prod_{d=1}^{D} \sum_{i=1}^{l_{k,d}} \pi_{k,d,i} G(y_{n,d}, \mu_{k,d,i}, \sigma^2_{k,d,i})}{\sum_{k'=1}^{K} \rho_k \prod_{d'=1}^{D} \sum_{i'=1}^{l_{k',d'}} \pi_{k',d',i'} G(y_{n,d}, \mu_{k',d',i'}, \sigma_{k',d',i'})}$$

$$w_{n,k,d,i} = E(u_n \rho z_{n,d,i}|y_n, \theta) =$$

$$\frac{\rho_k \pi_{k,d,i} \prod_{d' \neq d} \sum_{i=1}^{l_{k,d'}} \pi_{k,d',i} G(y_{n,d'}, \mu_{k,d',i}, \sigma^2_{k,d',i})}{\sum_{k'=1}^{K} \rho_k \prod_{d'=1}^{D} \sum_{i'=1}^{l_{k',d'}} \pi_{k',d',i'} G(y_{n,d}, \mu_{k',d',i'}, \sigma^2_{k',d',i'})}$$

In the M-step, we maximize the auxiliary function Q to update the parameter estimation $$\theta = \arg \max_\theta Q(\theta, \hat{\theta})$$

We have the following iterative scheme. Note that the transform matrix A can be initialized as the current estimate or as an identity matrix.

(1) Update the compound Gaussian model parameters:

$$\hat{\rho}_k = \frac{\sum_{n=1}^{N} w_{n,k}}{\sum_{k'=1}^{K}\sum_{n=1}^{N} w_{n,k'}}$$

$$\hat{\pi}_{k,d,i} = \frac{\sum_{n=1}^{N} w_{n,k,d,i}}{\sum_{i'=1}^{l_{k,d}}\sum_{n=1}^{N} w_{n,k,d,i'}}$$

$$\hat{\mu}_{k,d,i} = \frac{\sum_{n=1}^{N} w_{n,k,d,i} y_{n,d}}{\sum_{i'=1}^{l_{k,d}}\sum_{n=1}^{N} w_{n,k,d,i'}}$$

$$\sigma^2_{k,d,i} = \frac{\sum_{n=1}^{N} w_{n,k,d,i}(y_{n,d}-m_{k,d,i})^2}{\sum_{i'=1}^{l_{k,d}}\sum_{n=1}^{N} w_{n,k,d,i'}}$$

where the transformed data are obtained using the current estimate of A: $y_n = Ax_n$.

(2) Update the transform matrix A. We will update A row by row. Let the vector $a_j$ be the j-th row of A, let $c_j = (c_1, \ldots, c_D)$ be the co-factors of A associated with the j-th row. Note that $a_j$ and $c_j$ are both row vectors. We plug in $Q(\theta, \hat{\theta})$ the updated $(\hat{\pi}, \hat{\mu}, \hat{\sigma})$.

$$Q = N \log(a_j c_j^T) - \frac{1}{2}\sum_{n=1}^{N}\sum_{d=1}^{D}\sum_{k=1}^{K}\sum_{i=1}^{l_{k,d}} w_{n,k,d,i}\frac{(a_d x_n - \hat{\mu}_{k,d,i})^2}{\hat{\sigma}^2_{k,d,i}} + const =$$

$$N \log(a_j c_j^T) - \frac{1}{2}\sum_{d=1}^{D} a_d G_d a_d^T + \sum_{d=1}^{D} a_d h_d^T + const$$

where $$G_d = \sum_{k=1}^{K}\sum_{i=1}^{l_{k,d}} \frac{1}{\hat{\sigma}_{k,d,i}^2}\left(\sum_{n=1}^{N} w_{n,k,d,i} x_n^T x_n\right)$$

$$h_d = \sum_{k=1}^{K}\sum_{i=1}^{l_{k,d}} \frac{\hat{\mu}_{k,d,i}}{\hat{\sigma}_{k,d,i}^2}\left(\sum_{n=1}^{N} w_{n,k,d,i} x_n^T\right)$$

Therefore, the j-th row of $a_j$ can be updated as $$\hat{a}_j = (\beta c_j + h_j) G_j^{-1}$$

where $\beta$ can be solved from the quadratic equation (6).

$$\beta^2 c_j G_j^{-1} c_j^T + \beta h_j G_j^{-1} c_j^T - N = 0.$$

A description of feature extraction via Gaussianization will now be given. In the problem of classification, we are often interested in extracting a lower dimensional feature from the original feature such that the new feature has the lowest dimension possible, but retains as much discriminative information among the classes as possible. If we have lower dimensional features, we often need less raining data and we can train more robust classifiers.

We now consider feature extraction with the naive Bayesian classifier. Let $x \in R^D$ be the original feature, and $c \in \{1, \ldots, L\}$) be the class label. By the Bayes formula $$p(c|x) = \frac{p(x|c)p(c)}{p(x)}$$

and we classify x as $$\hat{c} = \arg\max p(x|c)p(c)$$

where p(x|c) is the probability density of the feature vector and p(c) is the prior probability for class c. Typically, p(x|c) can be modeled as a parametric density $$p(x|c, \theta_c)$$

where the parameters $\theta_c$ can be estimated from the training data. We seek a transform T such that the naive Bayesian classifier in the transformed feature space y=T(x) outperforms the naive Bayesian classifier in the original feature space. Let $\{x_i, c_i: 1 \leq i \leq N\}$ be the training data.

Prior work has focused on linear transforms. In the well-known linear discriminant analysis (LDA), we assume that the class densities are Gaussian with a common covariance matrix $$p(y|c) = G(y, \mu_c, \Sigma);$$

We estimate the transform matrix T via maximum likelihood $$[\hat{T}, \hat{\mu}, \hat{\Sigma}] = \arg\max_{T,\mu,\Sigma} \sum_{i=1}^{N} \log G(Tx, \mu_{c_i}, \Sigma) \quad (18)$$

Recently, there have been generalizations of LDA to heteroscedastic cases, e.g., the Heteroscedastic LDA and the semi-tied covariance. The Heteroscedastic LDA is described by N. Kumar, in "Investigation of Silicon-Auditory Models and Generalization of Linear Discriminant Analysis for Improved Speech Recognition", Ph.D. dissertation, John Hopkins University, Baltimore, Md., 1997. The semi-tied covariance is described by: R. A. Gopinath, in "Constrained Maximum Likelihood Modeling with Gaussian Distributions", Proc. of DARPA Speech Recognition Workshop, February 8–11, Lansdowne, Va., 1998; and M. J. F. Gales, in "Semi-tied Covariance Matrices for Hidden Markov Models", IEEE Transactions Speech and Audio Processing, Vol. 7, pp. 272–81, 1999. These techniques assume each class has its own covariance matrix, however, diagonal. Both the linear transform and the Gaussian model parameters can be estimated via maximum likelihood as in (18).

We consider here a particular nonlinear transform and we optimize the nonlinear transform via maximum likelihood. Motivation for our nonlinear transform will now be described. Linear techniques such as Heteroscedastic LDA and the semi-tied covariance assume diagonal covariance and attempt to find a linear transform such that the diagonal (i.e. independent) assumption is more valid. This is described by R. A. Gopinath, in "Constrained Maximum Likelihood Modeling with Gaussian Distributions", Proc. of DARPA Speech Recognition Workshop, February 8–11, Lansdowne, Va., 1998. We find a transform such that the Gaussian assumption is more valid, which leads us to Gaussianization.

We opt to Gaussianize each dimension separately, which can be followed by, e.g., the semi-tied covariance technique, to find the best linear projection. Theoretically, we can write out the log likelihood with respect to both the Gaussianization parameters and the linear projection parameters. However, it is extremely difficult to optimize them for a large dataset, such as in automatic speech recognition.

Without loss of generality, we assume $x \in R^1$. It is important to choose the proper parameterization of Gaussianization such that the maximum likelihood optimization can be carried out efficiently. We parameterize Gaussianization as a piecewise linear transform Gaussianization transform. We choose the knots to $t_0 \leq t_1 \leq \ldots \leq t_{M+1}$ such that $t_0 \leq x_n \leq t_{M+1}$. Let $$y = \sum_{m=0}^{M+1} \alpha_m h_m(x) \quad (19)$$

where $h_m$ are the first-order splines $$h_0(x) = \frac{t_1 - x}{t_1 - t_0} I(t_0 \leq x \leq t_1)$$

$$\ldots$$

$$h_m(x) = \frac{x - t_{m-1}}{t_m - t_{m-1}} I(t_{m-1} \leq x \leq t_m) + \frac{t_{m+1} - x}{t_{m+1} - t_m} I(t_m \leq x \leq t_{m+1})$$

$$h_{M+1}(x) = \frac{x - t_M}{t_{M+1} - t_M} I(t_M \leq x \leq t_{M+1})$$

Notice that $$\frac{\partial y}{\partial x} = \alpha_{m+1} - \alpha_m \quad \text{if} \quad t_m \leq x \leq t_{m+1}$$

We assume univariate Gaussian distribution for the transformed variable y $$p(y|c=1) = G(y, \mu_1, \sigma_1^2)$$

The log likelihood function $$L = \sum_{i=1}^{N} \left\{ \log\left|\frac{\partial x_n}{\partial y_n}\right| + \sum_{l=1}^{L} I(c_i = 1)\log G(z_n, \mu_1, \sigma_1^2) \right\}$$

$$= \sum_{i=1}^{N} \left[ \sum_{m=0}^{m} \log|\alpha_{m+1} - \alpha_m| I(t_m \leq x_n < t_{m+1}) \right] -$$

$$\frac{1}{2}\left[\sum_{i=1}^{N}\sum_{l=1}^{L} I(c_i = 1)\left\{\log|\sigma_1^2| + \frac{(y_n - \mu_1)^2}{\sigma_1^2}\right\}\right] + \text{const}$$

Denote $$N_1 = \sum_{i=1}^{N} I(c_i = 1)$$

and $$\gamma_m = \sum_{i=1}^{N} I(t_m \leq x_n < t_{m+1})$$

Clearly, $$\hat{\mu}_1 = \frac{\sum_{i=1}^{N} I(c_i = 1)z_n}{N_1} \qquad \hat{\sigma}_1^2 = \frac{\sum_{i=1}^{N} I(c_i = 1)(z_n - \mu_1)^2}{N_1}$$

i.e.

$$\hat{\mu}_1 = \sum_{m=0}^{M+1} \alpha_m \overline{h}_{1,m} \qquad \hat{\sigma}_1^2 = \sum_{m,m'=0}^{M+1} \alpha_m \alpha_{m'} \overline{H}_{1,m,m'} - \hat{\mu}_1^2$$

where $$\overline{h}_{1,m} = \frac{\sum_{i=1}^{N} I(c_i = 1)h_m(x_n)}{N_1} \qquad \overline{H}_{1,m,m'} = \frac{\sum_{i=1}^{N} I(c_i = 1)h_m(x_n)h_{m'}(x_n)}{N_1}$$

Denote $\alpha = (\alpha_0 \ldots \alpha_{M+1})^T$ $\overline{h}_1 = (\overline{h}_0 \ldots \overline{h}_{M+1})^T$ $\overline{H}_1 = (\overline{H}_{m,m'})_{(M+1)\times(M+1)}$ $G_1 = \overline{H}_1 - \overline{h}_1\overline{h}_1^T$ We have $\alpha_1^2 = \alpha^T G_1 \alpha$ Therefore, we can rewrite the log likelihood as $$L = \sum_{m=0}^{M} \gamma_m \log|\alpha_{m+1} - \alpha_m| - \frac{1}{2}\sum_{l=1}^{L} N_1 \log(\alpha^T G_1 \alpha) \qquad (20)$$

We constrain $\alpha_{m+1} > \alpha_m \forall 0 \leq m \leq M,$ i.e. we assume that the Gaussianization transform (as per equation 19) is strictly increasing. We can solve this using a standard numerical optimization package.

A description of various implementations of the methods of the present invention will now be given, along with test results of the iterative Gaussianization method of the invention.

It is to be understood that the present invention may be implemented in various forms of hardware, software, firmware, special purpose processors, or a combination thereof. Preferably, the present invention is implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 6:
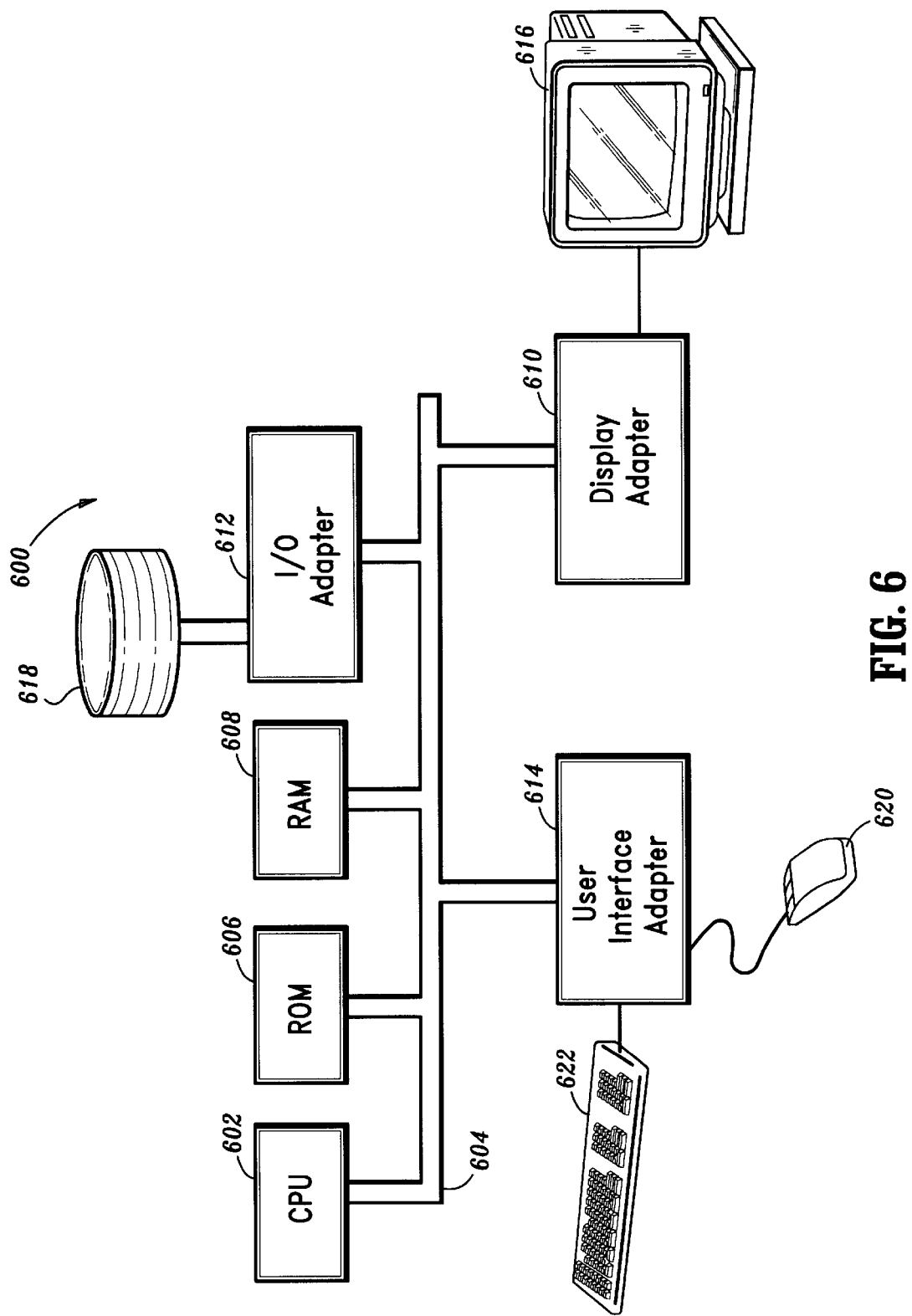
FIG. 6 is a block diagram of a computer processing system 600 to which the present invention may be applied according to an embodiment thereof.

FIG. 6 is a block diagram of a computer processing system 600 to which the present invention may be applied according to an embodiment thereof. The computer processing system includes at least one processor (CPU) 602 operatively coupled to other components via a system bus 604. A read-only memory (ROM) 606, a random access memory (RAM) 608, a display adapter 610, an I/O adapter 612, and a user interface adapter 614 are operatively coupled to the system but 604 by the I/O adapter 612.

A mouse 620 and keyboard 622 are operatively coupled to the system bus 604 by the user interface adapter 614. The mouse 620 and keyboard 622 may be used to input/output information to/from the computer processing system 600. It is to be appreciated that other configurations of computer processing system 600 may be employed in accordance with the present invention while maintaining the spirit and the scope thereof.

The iterative Gaussianization method of the invention, both as parametric projection pursuit and as hierarchical independent pursuit, can be effective in high dimensional structure mining and high dimensional data visualization. Also, most of the methods of the invention can be directly applied to automatic speech and speaker recognition. For example, the standard Gaussian mixture density models can be replaced by mixtures of compound Gaussians (with or without linear transforms).

TABLE 1

|  | Logarithm | 1-d Gaussianization |
|---|---|---|
| Word Error Rate | 18.5% | 18.1% |

The nonlinear feature extraction method of the present invention can be applied to the front end of a speech recognition system. Standard mel-cepstral computation involves taking the logarithm of the Mel-binned Fourier spectrum. According to an embodiment of the invention, the logarithm is replaced by univariate Gaussianization along each dimension. The univariate Gaussianization is estimated by pooling the entire training data for all the classes. Table 1 illustrates the results of using this technique on the 1997 DARPA HUB4 Broadcast News Transcription Evaluation data using an HMM system with 135K Gaussians. As shown, modest improvements (0.4%) are obtained. One would expect that the nonlinear feature extraction algorithm provided above, which is optimized for multiple population would perform better.

Although the illustrative embodiments have been described herein with reference to the accompanying drawings, it is to be understood that the present invention is not limited to those precise embodiments, and that various other changes may be affected therein by one of ordinary skill in the art without departing from the scope or spirit of the invention. All such changes and modifications are intended to be included within the scope of the invention as defined by the appended claims.

What is claimed is:

1. A method for generating a high dimensional density model within an acoustic model for one of a speech and a speaker recognition system, the density model having a plurality of components, each component having a plurality of coordinates corresponding to a feature space, the method comprising the steps of:

transforming acoustic data obtained from at least one speaker into high dimensional feature vectors;

forming the density model to model the feature vectors by a mixture of compound Gaussians with a linear transform, wherein each compound Gaussian is associated with a compound Gaussian prior and models each of the coordinates of each of the components of the density model independently by a univariate Gaussian mixture comprising a univariate Gaussian prior, variance, and mean.

2. The method according to claim 1, further comprising the step of applying an iterative expectation maximization (EM) method to the feature vectors, to estimate the linear transform, the compound Gaussian priors, and the univariate Gaussian priors, variances, and means.

3. The method according to claim 2, wherein the EM method comprises the steps of:

computing an auxiliary function Q of the EM method;

respectively updating the compound Gaussian priors and the univariate Gaussian priors, to maximize the auxiliary function Q;

respectively updating the univariate Gaussian variances, the linear transform row by row, and the univariate Gaussian means, to maximize the auxiliary function Q;

repeating said second updating step, until the auxiliary function Q converges to a local maximum;

repeating said computing step and said second updating step, until a log likelihood of the feature vectors converges to a local maximum.

4. The method according to claim 3, further comprising the step of updating the density model to model the feature vectors by the mixture of compound Gaussians with the updated linear transform, wherein each of the compound Gaussians is associated with one of the updated compound Gaussian priors and models each of the coordinates of each of the components independently by the univariate Gaussian mixtures comprising the updated univariate Gaussian priors, variances, and means.

5. The method according to claim 3, wherein the linear transform is fixed, when the univariate Gaussian variances are updated.

6. The method according to claim 3, wherein the univariate Gaussian variances are fixed, when the linear transform is updated.

7. The method according to claim 3, wherein the linear transform is fixed, when the univariate Gaussian means are updated.

8. A method for generating a high dimensional density model within an acoustic model for one of a speech and a speaker recognition system, comprising the steps of:

transforming-acoustic data obtained from at least one speaker into high dimensional feature vectors;

forming the density model to model the feature vectors by a mixture of compound Gaussians with a linear transform, wherein each compound Gaussian is associated with a compound Gaussian prior and models each coordinate of each component of the density model independently by a univariate Gaussian mixture comprising a univariate Gaussian prior, variance, and mean;

applying an iterative expectation maximization (EM) method to the feature vectors, comprising the steps of:

computing an auxiliary function Q of the EM method;

respectively updating the compound Gaussian priors and the univariate Gaussian priors, to maximize the function Q;

respectively updating the univariate Gaussian variances, the linear transform row by row, and the univariate Gaussian means, to maximize the function Q;

repeating said second updating step, until the auxiliary function Q converges to a local maximum;

repeating said computing step and said second updating step, until a log likelihood of the feature vectors converges to a local maximum; and updating the density model to model the feature vectors by the mixture of compound Gaussians with the updated linear transform, wherein each compound Gaussian is associated with one of the updated compound Gaussian priors and models each of the coordinates of each of the components independently by univariate Gaussian mixtures comprising the updated univariate Gaussian priors, variances, and means.

9. The method according to claim 8, wherein the linear transform is fixed, when the univariate Gaussian variances are updated.

10. The method according to claim 8, wherein the univariate Gaussian variances are fixed, when the linear transform is updated.

11. The method according to claim 8, wherein the linear transform is fixed, when the univariate Gaussian means are updated.

12. The method according to claim 8, further comprising the step of determining the log likelihood of the high dimensional acoustic data, prior to said applying step.

13. The method according to claim 12, wherein the auxiliary function Q is computed based upon the log likelihood of the feature vectors.

14. A program storage device readable by machine, tangibly embodying a program of instructions executable by the machine to perform method steps for generating a high dimensional density model within an acoustic model for one of a speech and a speaker recognition system, said method steps comprising:

forming the density model to model feature vectors obtained from at least one speaker by a mixture of compound Gaussians with a linear transform, wherein each compound Gaussian is associated with a compound Gaussian prior and models each coordinate of each component of the density model independently by a univariate Gaussian mixture comprising a univariate Gaussian prior, variance, and mean;

applying an iterative expectation maximization (EM) method to the feature vectors, comprising the steps of:

computing an auxiliary function Q of the EM method;

respectively updating the compound Gaussian priors and the univariate Gaussian priors, to maximize the function Q;

respectively updating the univariate Gaussian variances, the linear transform row by row, and the univariate Gaussian means, to maximize the function Q;

repeating said second updating step, until the auxiliary function Q converges to a local maximum;

repeating said computing step and said second updating step, until a log likelihood of the feature vectors converges to a local maximum; and updating the density model to model the feature vectors by the mixture of compound Gaussians with the updated linear transform, wherein each compound Gaussian is associated with one of the updated compound Gaussian priors and models each of the coordinates of each of the components independently by univariate Gaussian mixtures comprising the updated univariate Gaussian priors, variances, and means.

15. The program storage device according to claim 14, wherein the linear transform is fixed, when the univariate Gaussian variances are updated.

16. The program storage device according to claim 14, wherein the univariate Gaussian variances are fixed, when the linear transform is updated.

17. The program storage device according to claim 14, wherein the linear transform is fixed, when the univariate Gaussian means are updated.

18. The program storage device according to claim 14, further comprising the step of determining the log likelihood of the high dimensional acoustic data, prior to said applying step.

19. The program storage device according to claim 18, wherein the auxiliary function Q is computed based upon the log likelihood of the feature vectors.

* * * * *